United States Patent
Kim et al.

(10) Patent No.: US 8,023,073 B2
(45) Date of Patent: Sep. 20, 2011

(54) COLOR FILTER DISPLAY PANEL, THIN FILM TRANSISTOR ARRAY PANEL, LIQUID CRYSTAL DISPLAY THEREOF, AND METHOD THEREOF

(75) Inventors: Sang-Woo Kim, Suwon-si (KR); Cheong-Haeng Lee, Incheon-si (KR); Won-Sang Park, Yongin-si (KR); Young-Joo Chang, Suwon-si (KR); Jun-Young Lee, Yongin-si (KR); Sung-Wook Kang, Seoul (KR); Jae-Young Lee, Yongin-si (KR); Hae-Young Yun, Suwon-si (KR); Jae-Ik Lim, Seoul (KR); Seung-Kyu Lee, Suwon-si (KR); Chang-Woo Shim, Seoul (KR); Yong-Suk Yeo, Jecheon-si (KR); Ji-Youn Choi, Yongin-si (KR)

(73) Assignee: Samsung Electronics Co., Ltd. (KR)

(*) Notice: Subject to any disclaimer, the term of this patent is extended or adjusted under 35 U.S.C. 154(b) by 1049 days.

(21) Appl. No.: 11/521,010

(22) Filed: Sep. 14, 2006

(65) Prior Publication Data

US 2007/0171336 A1    Jul. 26, 2007

(30) Foreign Application Priority Data

Jan. 26, 2006  (KR) .................. 10-2006-0008145
Feb. 22, 2006  (KR) .................. 10-2006-0017205

(51) Int. Cl.
*G02F 1/1335*    (2006.01)
(52) U.S. Cl. .................................................... 349/106
(58) Field of Classification Search .................. None
See application file for complete search history.

(56) References Cited

U.S. PATENT DOCUMENTS

| 6,788,370 B2 | 9/2004 | Itou et al. ............... 349/117 |
| 2004/0105059 A1* | 6/2004 | Ohyama et al. ........... 349/114 |
| 2004/0125292 A1 | 7/2004 | Meada ..................... 349/117 |
| 2005/0185117 A1* | 8/2005 | Kashima .................. 349/97 |
| 2010/0053488 A1* | 3/2010 | Kim et al. ................. 349/48 |

FOREIGN PATENT DOCUMENTS

| JP | 2001-290148 | 10/2001 |
| JP | 2003-98523 | 4/2003 |
| JP | 2003-107462 | 4/2003 |
| JP | 2003-161944 | 6/2003 |
| JP | 2004-20610 | 1/2004 |
| JP | 2004-94225 | 3/2004 |
| KR | 10-0391241 | 7/2003 |
| KR | 10-0474367 | 2/2005 |
| KR | 10-0513939 | 9/2005 |
| KR | 10-0519832 | 9/2005 |
| KR | 10-2005-0104322 | 11/2005 |

* cited by examiner

*Primary Examiner* — David Nelms
*Assistant Examiner* — Mary A El-Shammaa
(74) *Attorney, Agent, or Firm* — Cantor Colburn LLP

(57) ABSTRACT

A liquid crystal display ("LCD") includes forming only a λ/4 plate between a polarizer and a display panel and setting a direction of an absorption axis of the polarizer and a slow axis of the λ/4 plate, so that the LCD can have a smaller thickness and its fabrication cost can be reduced while having better or the same characteristics than an LCD using both λ/2 and λ/4 plates. In addition, in an ECB mode backlit LCD, transmittance, contrast ratio, and viewing angles can be enhanced by attaching both the λ/4 or λ/2 plate and allowing the absorption axis of the polarizer and the slow axis of the λ/4 and λ/2 plates to have predetermined angle relationships.

15 Claims, 23 Drawing Sheets

COLOR FILTER DISPLAY PANEL, THIN FILM TRANSISTOR ARRAY PANEL, LIQUID CRYSTAL DISPLAY THEREOF, AND METHOD THEREOF

This application claims priority to Korean Patent Application No. 10-2006-0008145 filed on Jan. 26, 2006, and 10-2006-0017205 filed on Feb. 22, 2006 and all the benefits accruing therefrom under 35 U.S.C. §119, and the contents of which in its entirety are herein incorporated by reference.

BACKGROUND OF THE INVENTION (a) Field of the Invention

The present invention relates to a color filter display panel, thin film transistor ("TFT") array panel, liquid crystal display ("LCD") thereof, and method thereof. More particularly, the present invention relates to a color filter display panel and TFT array panel each having a reduced fabrication unit cost and smaller thickness, an LCD having the color filter display panel and the TFT array panel and having improved luminance and viewing angle characteristics, and a method of maintaining or improving luminance and viewing angle characteristics of the LCD.

(b) Description of the Related Art

A liquid crystal display ("LCD"), one of the most commonly used flat panel displays, includes two display panels on which field generating electrodes such as a pixel electrode and a common electrode are formed and a liquid crystal layer interposed there between. In the LCD, a voltage is applied to the field generating electrodes to generate an electric field on the liquid crystal layer to thereby determine an alignment of liquid crystal molecules of the liquid crystal layer and control polarization of an incident light, thereby allowing display of images.

According to a light source, the LCD can be divided into a backlit LCD that displays images by using a lighting unit positioned at a rear surface of a liquid crystal cell, a reflective LCD that displays images by using natural external light, and a transflective LCD, a combination of the backlit LCD and the reflective LCD, which is operated in a transmission mode to display images by using an internal light source of a display element itself in an indoor or dark environment where there is no external light source, and is operated in a reflection mode to display images by reflecting external light in an outdoor environment with high illumination intensity.

BRIEF SUMMARY OF THE INVENTION

The present invention provides a liquid crystal display ("LCD") having advantages of reducing a fabrication unit cost and having a smaller thickness, and improving its characteristics such as luminance and viewing angle.

The present invention improves luminance and a viewing angle of an electrically controlled birefringence ("ECB") mode LCD.

In order to solve problems of the related art, in exemplary embodiments of the present invention, only a $\lambda/4$ plate and a polarizer are formed at an outer side of a display panel.

In addition, in exemplary embodiments of the present invention, a phase difference film, as well as the polarizer, is additionally attached on an outer side of an LCD.

Exemplary embodiments of the present invention provide a color filter display panel including a substrate including color filters, a $\lambda/4$ plate formed at an outer side of the substrate and having a slow axis, and a polarizer attached at an outer side of the $\lambda/4$ plate and having an absorption axis, wherein the slow axis of the $\lambda/4$ plate is at 147±10 degrees with respect to a reference direction, and the absorption axis of the polarizer is at 15±10 degrees with respect to the reference direction.

The $\lambda/4$ plate may have a phase difference value ($\Delta$nd) of 155 nm±20 nm when a wavelength of light passing through the $\lambda/4$ plate is 550 nm.

The substrate, the $\lambda/4$ plate and the polarizer may be attached to each other by an adhesive. Alternatively, the $\lambda/4$ plate may be coated on a lower surface of the polarizer, in which case the $\lambda/4$ plate may be hardened with an alignment layer and a liquid crystal layer on the lower surface of the polarizer.

A passivation layer may be formed on the outer surface of the polarizer through hard coating or an anti-reflective treatment.

Thickness of the display panel may be reduced by excluding a $\lambda/2$ plate from the display panel.

Other exemplary embodiments of the present invention provide a thin film transistor ("TFT") array panel including a substrate including TFTs, a $\lambda/4$ plate formed at an outer side of the substrate and having a slow axis, and a polarizer attached at an outer side of the $\lambda/4$ plate and having an absorption axis, wherein the slow axis of the $\lambda/4$ plate is at 114±10 degrees with respect to a reference direction and the absorption axis of the polarizer is at 75±10 degrees with respect to the reference direction.

The $\lambda/4$ plate may have a phase difference value ($\Delta$nd) of 135 nm±20 nm when a wavelength of light passing through the $\lambda/4$ plate is 550 nm.

The substrate, the $\lambda/4$ plate, and the polarizer may be attached to each other by an adhesive. Alternatively, the $\lambda/4$ plate may be coated on a lower surface of the polarizer, in which case the $\lambda/4$ plate may be hardened with an alignment layer and a liquid crystal layer on the lower surface of the polarizer.

A passivation layer may be formed on an outer surface of the polarizer through hard coating or an anti-reflective treatment.

Thickness of the array panel may be reduced by excluding a $\lambda/2$ plate from the array panel.

Still other exemplary embodiments of the present invention provide an LCD including a color filter display panel, a TFT array panel, and a liquid crystal layer formed there between. The color filter display panel includes a first substrate including color filters, a first $\lambda/4$ plate formed at an upper side of the first substrate and having a slow axis, and a first polarizer attached on an upper side of the first $\lambda/4$ plate and having an absorption axis, wherein the slow axis of the first $\lambda/4$ plate is at 147±10 degrees with respect to a reference direction and the absorption axis of the first polarizer is at 15±10 degrees with respect to the reference direction. The TFT array panel includes a second substrate including TFTs, a second $\lambda/4$ plate formed at a lower side of the second substrate and having a slow axis, and a second polarizer attached at a lower side of the second $\lambda/4$ plate and having an absorption axis, wherein the slow axis of the second $\lambda/4$ plate is at 66±10 degrees with respect to the reference direction and the absorption axis of the second polarizer is at 105±10 degrees with respect to the reference direction.

The first $\lambda/4$ plate may have a phase difference value ($\Delta$nd) of 155 nm±20 nm when a wavelength of light passing through the first $\lambda/4$ plate is 550 nm, and the second $\lambda/4$ plate may have a phase difference value ($\Delta$nd) of 135 mm±20 nm when a wavelength of light passing through the second $\lambda/4$ plate is 550 nm.

The first substrate, the first $\lambda/4$ plate, and the first polarizer may be attached to each other by an adhesive, and the second substrate, the second λ/4 plate, and the second polarizer may also be attached to each other by an adhesive. alternatively, the first and second λ/4 plates may be coated on the first and second polarizers, respectively, in which case the first and second λ/4 plates may be hardened with an alignment layer and a liquid crystal layer on the first and second polarizers, respectively.

First and second passivation layers may be formed at outer sides of the first and second polarizers, respectively, through a hard coating or an anti-reflective treatment.

A viewing angle of liquid crystal may be ±40 degrees from a one o'clock direction.

A λ/2 plate may be excluded from the color filter display panel and from the TFT array panel to reduce a thickness of the LCD, and angles of the slow axes and the absorption axes maintain luminance and viewing angle characteristics of the LCD.

Yet other exemplary embodiments of the present invention provide an LCD including a color filter display panel, a TFT array panel, and a liquid crystal layer formed there between. The color filter display panel includes a first substrate including color filters, a first λ/4 plate formed at an upper side of the first substrate and having a slow axis, and a first polarizer attached on an upper side of the first λ/4 plate and having an absorption axis, wherein the slow axis of the first λ/4 plate is at 0±10 degrees with respect to a first reference direction and the absorption axis of the first polarizer is at 135±10 degrees with respect to the first reference direction. The TFT array panel includes a second substrate including TFTs, a second λ/4 plate formed at a lower side of the second substrate and having a slow axis, and a second polarizer attached at a lower side of the second λ/4 plate and having an absorption axis, wherein the slow axis of the second λ/4 plate is at 90±10 degrees with respect to a second reference direction and the absorption axis of the second polarizer is at 135±10 degrees with respect to a second reference direction.

The first λ/4 plate may have a phase difference value (Δnd) of 135 nm±20 nm when a wavelength of light passing through the first λ/4 plate is 550 nm, and the second λ/4 plate may have a phase difference value (Δnd) of 100 nm±20 nm when a wavelength of light passing through the second λ/4 plate is 550 nm.

The first substrate, the first λ/4 plate, and the first polarizer can be attached to each other by an adhesive, and the second substrate, the second λ/4 plate and the second polarizer can also be attached to each other by an adhesive.

First and second passivation layers can be additionally formed at outer surfaces of the first and second polarizers, respectively, through an anti-glaring, anti-reflection, anti-scratch, or hard coating treatment, etc.

The liquid crystal is an ECB mode liquid crystal, and a cell gap between the color filter display panel and the TFT array panel can be 3.8 μm.

The first and second reference directions can be a three o'clock direction when the LCD is observed from a top of the LCD.

Still other exemplary embodiments of the present invention provide an LCD including a color filter display panel, a thin film transistor ("TFT") array panel, and a liquid crystal layer formed there between. The color filter display panel includes a first substrate including color filters, a first λ/4 plate formed at an upper side of the first substrate and having a slow axis, a first λ/2 plate formed at an upper side of the first λ/4 and having a slow axis, and a first polarizer attached on an upper side of the first λ/2 plate and having an absorption axis, wherein the slow axis of the first λ/4 plate is at 110±10 degrees with respect to a first reference direction, the slow axis of the first λ/2 is at 48±10 degrees with respect to the first reference direction, and the absorption axis of the first polarizer is at 31±10 degrees with respect to the first reference direction. The TFT array panel includes a second substrate including TFTs, a second λ/4 plate formed at a lower side of the second substrate and having a slow axis, a second λ/2 plate formed at a lower side of the second λ/4 plate and having a slow axis, and a second polarizer attached at a lower side of the second λ/2 plate and having an absorption axis, wherein the slow axis of the second λ/4 plate is at 70±10 degrees with respect to a second reference direction, the slow axis of the second λ/2 plate is at 6±10 degrees with respect to the second reference direction, and the absorption axis of the second polarizer is at 77±10 degrees with respect to the second reference direction.

The first λ/4 plate may have a phase difference value (Δnd) of 135 nm±20 nm when a wavelength of light passing through the first λ/4 plate is 550 nm, the second λ/4 plate may have a phase difference value (Δnd) of 100 nm±20 nm when a wavelength of light passing through the second λ/4 plate is 550 nm, and the first and second λ/2 plates may have a phase difference value (Δnd) of 270 nm±20 nm when a wavelength of light passing through the first and second λ/2 plates is 550 nm.

The first substrate, the first λ/4 plate, the first λ/2 plate, and the first polarizer can be attached to each other by an adhesive, and the second substrate, the second λ/4 plate, the second λ/2 plate, and the second polarizer can also be attached to each other by an adhesive.

First and second passivation layers can be additionally formed at outer surfaces of the first and second polarizers, respectively, through an anti-glaring, anti-reflection, anti-scratch, or hard coating treatment, etc.

The liquid crystal is an ECB mode liquid crystal, and a cell gap between the color filter display panel and the TFT array panel can be 3.8 μm.

The reference direction can be the three o'clock direction when the LCD is observed from a top of the LCD.

Still other exemplary embodiments of the present invention provide a method of maintaining or improving luminance and viewing angle characteristics of a liquid crystal display, the liquid crystal display including a color filter display panel, a thin film transistor array panel, and a liquid crystal layer there between, the method including forming a first λ/4 plate with a first slow axis on an outer side of a first substrate of the color filter display panel, forming a second λ/4 plate with a second slow axis on an outer side of a second substrate of the thin film transistor array panel, forming a first polarizer with a first absorption axis on an outer side of the first λ/4 plate, forming a second polarizer with a second absorption axis on an outer side of the second λ/4 plate, and setting, at a particular cell gap of the liquid crystal layer, an angle relationship between the first slow axis and the first absorption axis and an angle relationship between the second slow axis and the second absorption axis, at a selected reference direction, to maintain or improve luminance and viewing angle characteristics of the liquid crystal display.

The method may further include reducing a thickness of the liquid crystal display while maintaining luminance and viewing angle characteristics of the liquid crystal display by eliminating first and second λ/2 plates from between the first and second λ/4 plates and the first and second polarizers, respectively.

The method may instead further include improving luminance and viewing angle characteristics of the liquid crystal display by adding first and second λ/2 plates between the first and second λ/4 plates and the first and second polarizers, respectively.

BRIEF DESCRIPTION OF THE DRAWINGS

The above and other features and advantages of the present invention will become more apparent by describing exemplary embodiments thereof with reference to the accompanying drawings, in which.

DETAILED DESCRIPTION OF THE INVENTION

Figure 1:
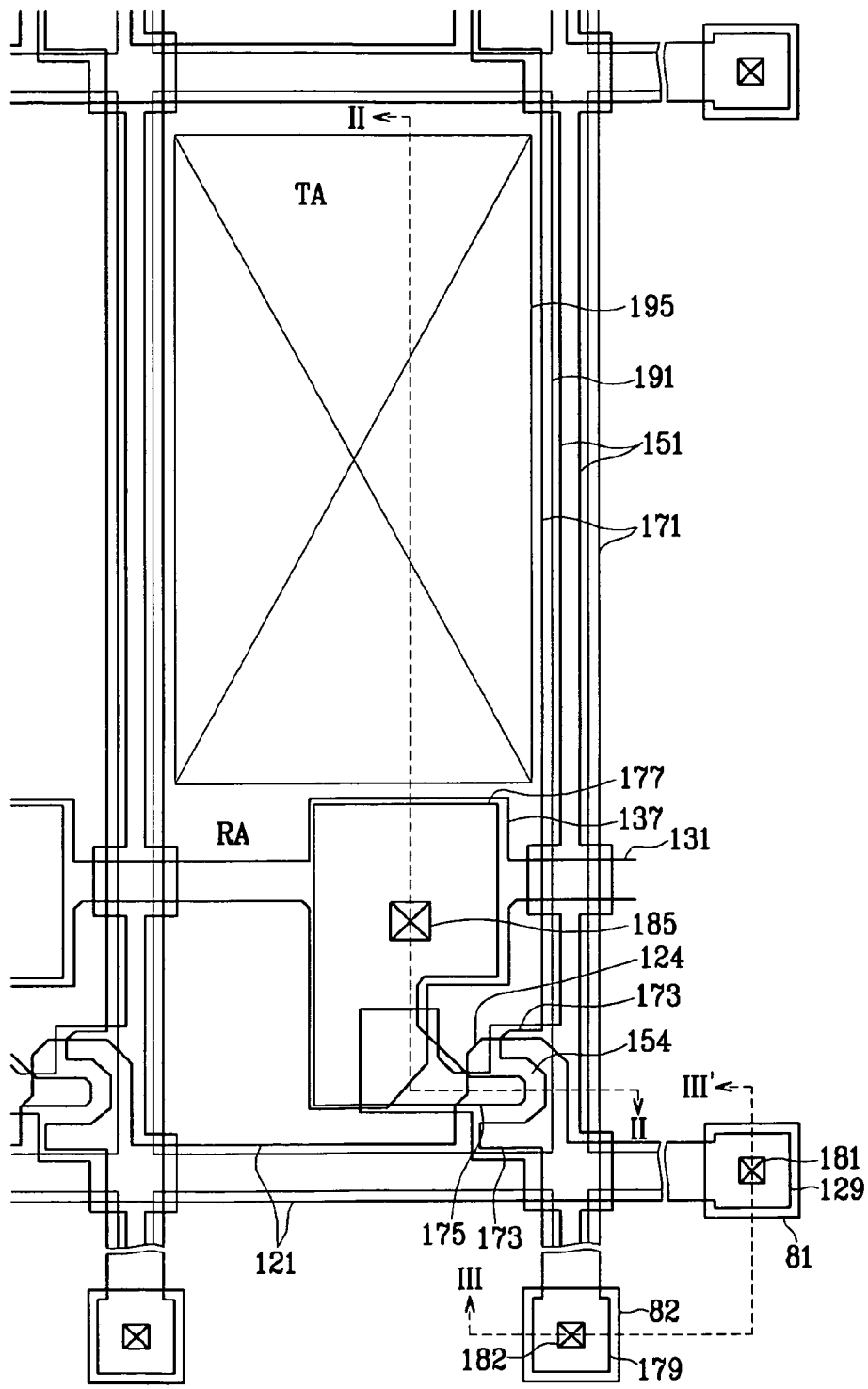
FIG. 1 is a layout view of an exemplary liquid crystal display ("LCD") according to an exemplary embodiment of the present invention.

The present invention now will be described more fully hereinafter with reference to the accompanying drawings, in which preferred embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Hereinafter, the present invention will be described in detail with reference to the accompanying drawings.

First, an exemplary liquid crystal display ("LCD") according to an exemplary embodiment of the present invention will be described with reference to FIGS. 1 to 3.

Figure 2:
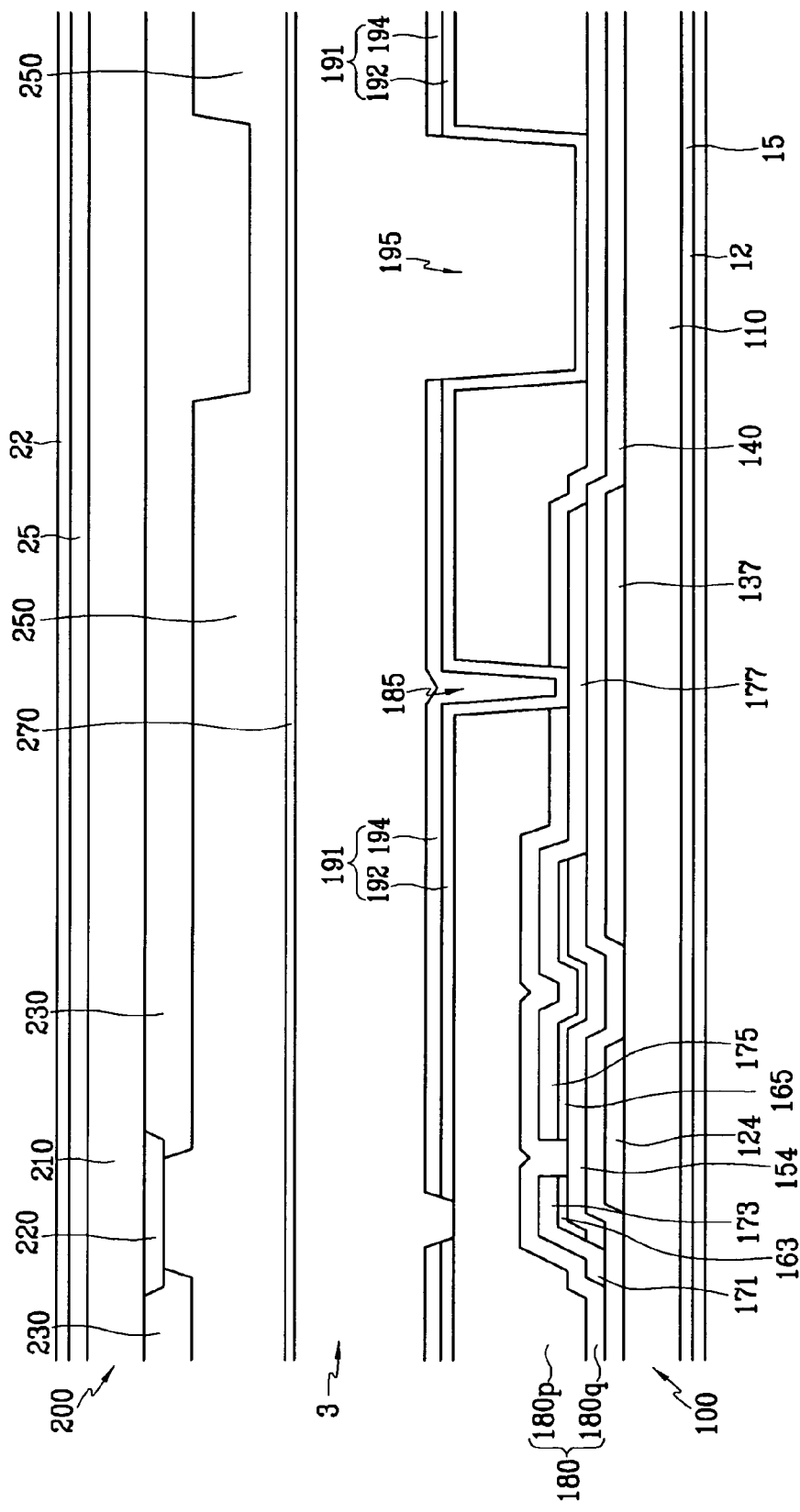
FIGS. 2 and 3 are cross-sectional views taken along lines II-II' and III-III' of the exemplary LCD in FIG. 1, respectively.
Figure 3:
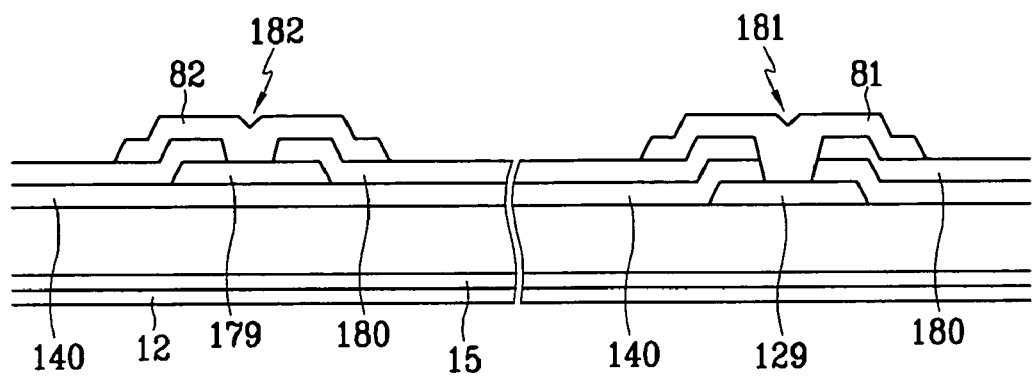

FIG. 1 is a layout view of an exemplary LCD according to an exemplary embodiment of the present invention, and FIGS. 2 and 3 are cross-sectional views taken along lines II-II' and III-III' of the exemplary LCD in FIG. 1, respectively.

As illustrated in FIGS. 1-3, an LCD includes a thin film transistor ("TFT") array panel 100, a color filter display panel 200 that faces the TFT array panel 100, and a liquid crystal layer 3 inserted between the TFT array panel 100 and the color filter display panel 200 and including liquid crystal molecules aligned vertically or horizontally to surfaces of the two display panels 100 and 200.

First, the TFT array panel 100 will be described as follows.

A plurality of gate lines 121 and a plurality of storage electrode lines 131 are formed on an insulation substrate 110 made of transparent glass or plastic, etc.

The gate lines 121 transfer gate signals, such as from a gate driving circuit, and mainly extend in a horizontal direction, a first direction. Each gate line 121 includes a plurality of gate electrodes 124 that are protruded upward, towards an adjacent gate line 121, and an end portion 129 with a large area for connection with a different layer or an external driving circuit. A gate driving circuit (not shown) that generates a gate signal can be mounted on a flexible printed circuit film (not shown) attached on the substrate 110, directly mounted on the substrate 110, or integrated with the substrate 110. When the gate driving circuit is integrated with the substrate 110, the gate lines 121 can be elongated to be directly connected therewith.

Storage electrode lines 131 receive a predetermined voltage, and extend substantially parallel to the gate lines 121. Each storage electrode line 131 is positioned between two adjacent gate lines 121, and nearer to the lower one of the two adjacent gate lines 121. The storage electrode line 131 includes a storage electrode 137 that extends upward and downward, towards both adjacent gate lines 121. Without being limited thereto, the storage electrode line 131 can be modified to have various shapes and dispositions.

The side of each gate line 121 and storage electrode line 131 is sloped with respect to the substrate 110, and preferably the slope angle is within the range of about 30 degrees to about 80 degrees.

A gate insulating layer 140 made of silicon nitride (SiNx) or silicon oxide (SiOx), etc., is formed on the gate line 121 and the storage electrode line 131, as well as on exposed portions of the substrate 110.

A plurality of semiconductor stripes 151 made of hydrogenated amorphous silicon ("a-Si") or polycrystalline silicon, etc., are formed on the gate insulating layer 140. The semiconductor stripes 151 extend mainly in a vertical direction, a second direction substantially perpendicular to the first direction, and include a plurality of projections 154 extending toward the gate electrodes 124. The semiconductor stripes 151 are increased in their width near the gate lines 121 and the storage electrode lines 131 to extensively cover them.

A plurality of ohmic contact stripes, mainly hidden by data lines 171, and islands 165 are formed on the semiconductor stripes 151. The ohmic contact stripes and islands 165 can be made of a material such as n+ hydrogenated a-Si in which an n-type impurity such as phosphor is doped with high density, or silicide. The ohmic contact stripe includes a plurality of projections 163, and a projection 163 and an ohmic contact island 165 are disposed as a pair on a projection 154 of a semiconductor stripe 151.

The sides of the semiconductor 151 and the ohmic contact stripe and island 165 also slope with respect to the surface of the substrate 110, and the slope angle is within the range of about 30 degrees to about 80 degrees.

A plurality of data lines 171 and a plurality of drain electrodes 175 are formed on the ohmic contact stripes and islands 165 and the gate insulating layer 140. The data lines 171 transfer data signals, such as from a data driving circuit, and mainly extend in the vertical direction, the second direction, to cross the gate lines 121 and the storage electrode lines 131. Each data line 171 includes a plurality of source electrodes 173 extending toward the gate electrodes 124 and an end portion 179 with a wide area for a connection with a different layer or an external driving circuit. A data driving circuit (not shown) that generates a data signal can be mounted on a flexible printed circuit film (not shown) attached on the substrate 110, directly mounted on the substrate 110, or integrated with the substrate 110. When the data driving circuit is integrated with the substrate 110, the data line 171 can be elongated to be directly connected therewith.

The data electrode 175 is separated from the data line 171 and faces the source electrode 173 centering on the gate electrode 124. Each drain electrode 175 includes one wide end portion 177 and one bar-type end portion. The wide end portion 177 overlaps the storage electrode 137, and the bar-type end portion is partially surrounded by the bent source electrode 173.

One gate electrode 124, one source electrode 173, and one drain electrode 175 constitute a TFT together with a projection 154 of the semiconductor stripes 151, and a channel of the TFT is formed at the projection 154 between the source electrode 173 and the drain electrode 175.

Preferably, the sides of the data line 171 and drain electrode 175 slope with respect to the surface of the substrate 110 at a slope angle ranging from about 30 degrees to about 80 degrees.

The ohmic contact stripe and island 165 exist only between the lower semiconductor stripe 151 and the upper data line 171 and the data electrode 175, and reduce contact resistance there between. Most portions of the semiconductor stripes 151 are narrower than the data lines 171, but as described above, the semiconductor stripes 151 become wide at a portion that meets the gate line 121, smoothing a profile of the surface, to thereby prevent a disconnection of the data line 171.

The semiconductor stripes 151 include exposed portions that are not covered by the data line 171 and the drain electrodes 175, like a portion between the source electrode 173 and the drain electrode 175.

A passivation layer 180 is formed on the data lines 171, the drain electrodes 175, and the exposed portions of the semiconductor stripes 151, as well as on exposed portions of the gate insulating layer 140. The passivation layer 180 includes a lower layer 180q made of an inorganic insulator such as silicon nitride or silicon oxide, and an upper layer 180p made of an organic insulator. Preferably, the upper passivation layer 180p has a dielectric constant of 4.0 or lower and may have photosensitivity, and concavo-convex portions (protrusions and depressions) can be formed on the surface thereof. An opening 195 (transmission window) is formed at the upper passivation layer 180p to expose a portion of the lower passivation layer 180q. Alternatively, the passivation layer 180 can have a single layer structure made of an inorganic insulator or an organic insulator.

A plurality of contact holes 182 and 185 are formed at the passivation layer 180, exposing the end portions 179 of the data lines 171 and the drain electrodes 175, respectively, and a plurality of contact holes 181 are formed at the passivation layer 180 and the gate insulating layer 140 to expose the end portions 129 of the gate lines 121.

A plurality of pixel electrodes 191 and a plurality of contact assistants 81 and 82 are formed on the passivation layer 180, and within the contact holes 185, 181, and 182.

Each pixel electrode 191 is formed on the upper passivation layer 180p, and includes a transparent electrode 192 and a reflecting electrode 194 formed on the transparent electrode 192. The transparent electrode 192 is made of a transparent conductive material such as indium tin oxide ("ITO") or indium zinc oxide ("IZO"), etc., and the reflecting electrode 194 is made of a reflective metal such as aluminum, silver, chromium, or their alloy, etc.

The reflecting electrode 194 is positioned adjacent the opening of the upper passivation layer 180p and has the transmission window 195 exposing the transparent electrode 192, which is positioned within the transmission window 195. The reflecting electrode 194 is formed on one portion of the transparent electrode 192 to expose some other portion of the transparent electrode 192, and the exposed portion of the transparent electrode 192 is positioned at the opening, transmission window 195, of the upper passivation layer 180p.

The pixel electrode 191 is physically and electrically connected with the drain electrode 175 via the contact hole 185, and receives a data voltage from the drain electrode 175. The pixel electrode 191, to which the data voltage has been applied, generates an electric field together with a common electrode 270, which receives a common voltage, of the color filter display panel 200, to thereby determine a direction of liquid crystal molecules of the liquid crystal layer 3 interposed between the two electrodes 191 and 270. Polarization of light that transmits through the liquid crystal layer 3 differs depending on the determined direction of the liquid crystal molecules. The pixel electrode 191 and the common electrode 270 form a capacitor (referred to hereinafter as a 'liquid crystal capacitor') to maintain the applied voltages even after the TFT is turned off.

The transflective LCD including the TFT array panel 100, the color filter display panel 200, and the liquid crystal layer 3 can be divided into a transmitting region TA and a reflecting region RA defined by the transparent electrode 192 and the reflecting electrode 194, respectively. Specifically, a portion below the transmitting window 195 is the transmitting region TA, and a portion below the reflecting electrode 194 is the reflecting region RA.

At the transmitting region TA, light made incident to the rear side of the LCD, namely, to the TFT array panel 100, transmits through the liquid crystal layer 3 and then comes out to the front surface, namely, to the color filter display panel 200, to thereby perform displaying. At the reflecting region RA, light coming from the front surface proceeds into the light crystal layer 3 and is then reflected by the reflecting electrode 194 to transmit again through the liquid crystal layer 3 so as to be emanated to the front surface, to thereby perform displaying.

In this case, an embossed surface (not shown) of the reflecting electrode 194 allows light to be reflected to be dispersed.

The transmitting region TA does not have the upper passivation layer 180p, so the thickness of the liquid crystal layer 3, or the cell gap, at the reflecting region (RA), corresponds to half of the cell gap at the transmitting region TA.

The pixel electrode 191 and an expanded portion 177 of the drain electrode 175 overlap with the storage electrode line 131 including the storage electrode 137. A capacitor formed as the pixel electrode 191 and the drain electrode 175 electrically connected with the pixel electrode 191 overlaps with the storage electrode line 131 and is called a storage capacitor that strengthens capability of voltage storage of the liquid crystal capacitor.

The contact assistants 81 and 82 are connected with the end portion 129 of the gate line 121 and the end portion 179 of the data line 171 through the contact holes 181 and 182. The contact assistants 81 and 82 complement bonding characteristics of the end portion 129 of the gate line 121 and the end portion 179 of the data line 171 with an external device, and protect them.

The color filter display panel 200 will be described as follows.

A light blocking member 220 is formed on an insulation substrate 210 made of transparent glass or plastic, etc. The light blocking member 220, which is also called a black matrix, defines a plurality of openings facing the pixel electrode 191 and prevents light leakage between the pixel electrodes 191.

A plurality of color filters 230 are formed on the substrate 210 and are disposed to be received in the openings surrounded by the light blocking member 220.

The color filter 230 can extend in a vertical direction along the pixel electrode 191 to form a stripe. Each color filter 230 can display one of three colors such as red, green, and blue. The color filters 230 have different thicknesses at the transmitting region TA and the reflecting region RA. At the transmitting region TA, light transmits through the color filter 230 once after having passed through the transparent electrode 192, but at the reflecting region RA, light passes through the color filter 230 twice, that is, when it is made incident to the color filter display panel 200 and is then reflected therefrom. Accordingly, the impression of colors may become different at the transmitting region TA and at the reflecting region RA, so in order to prevent this phenomenon, the color filter 230 at the transmitting region TA is formed to be thicker than that of the reflecting region RA. In addition to the method of forming the color filters 230 with different thicknesses, the impression of colors can also be made to be the same both at the transmitting region TA and at the reflecting region RA by forming a region (light hole) where the color filter 230 is not formed.

A planarization layer 250 is formed on the color filters 230 and the light blocking member 220, on which the common electrode 270 are formed. Preferably, the common electrode 270 is made of a transparent conductor such as ITO or IZO.

An alignment layer (not shown) for aligning the liquid crystal layer 3 is formed on inner surfaces of the display panels 100 and 200, and λ/4 plates 15 and 25 and polarizers 12 and 22 are provided on outer surfaces of the display panels 100 and 200, respectively, as will be further described below. The polarizers 12 and 22 adjust a transmission direction of light externally provided into the TFT array panel 100 and the color filter display panel 200, respectively, in accordance with an aligned direction of the liquid crystal layer 3. The first and second polarizers 12 and 22 may have first and second polarized axes thereof substantially perpendicular to each other, respectively. The λ/4 plates 15 and 25 may be types of phase difference films having a slow axis and allowing polarization light in a slow axis direction to be slower by λ/4 compared with polarization light perpendicular thereto, where A is the wavelength defining a distance between repeating units of a wave pattern of the light.

The upper polarizer 22 and the lower polarizer 12 each have an absorption axis, and the upper λ/4 plate 25 and the lower λ/4 plate 15 each have a slow axis. The angle relationship between the absorption axis and the slow axis will be further described with reference to FIGS. 6 and 7.

The LCD may include a plurality of spacers (not shown) for supporting the TFT array panel 100 and the color filter display panel 200 to form a gap there between.

The LCD may also include a sealant (not shown) for attaching the TFT array panel 100 to the color filter display panel 200. The sealant may be positioned at an edge of the color filter display panel 200.

Figure 4:
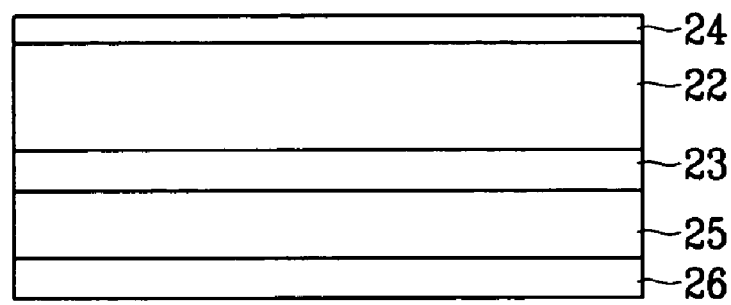
FIGS. 4 and 5 are enlarged views showing a section of an exemplary polarizer and an exemplary λ/4 plate of an exemplary color filter substrate according to an exemplary embodiment of the present invention.
Figure 5:
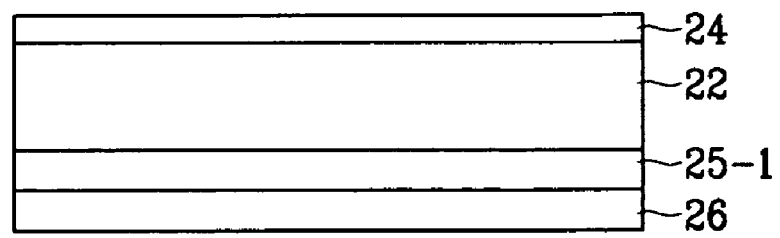

FIGS. 4 and 5 show a section of the polarizer 22 and the λ/4 plate 25 attached on the outer surfaces of the color filter display panel 200. Although FIGS. 4 and 5 show an arrangement of a section for the color filter display panel 200, the λ/4 plate 15 and polarizer 12 are also attached on the outer surfaces of the TFT array panel 100 in that order.

FIGS. 4 and 5 are enlarged views showing the section of the exemplary polarizer and the exemplary λ/4 plate according to exemplary embodiments of the present invention.

FIGS. 4 and 5 show different embodiments of the present invention, and the structure shown in FIG. 4 will be described first, as follows.

The λ/4 plate 25 and the polarizer 22 are sequentially attached on the outer surfaces of the color filter display panel 200, and the color filter display panel 200, the λ/4 plate 25, and the polarizer 22 are attached to each other by adhesives 23 and 26.

A passivation layer 24 is formed at an outer side of the polarizer 22 to protect the polarizer 22. In general, the polarizer 22 has a structure such that a Tri Acetate Cellulose ("TAC") film is attached at both sides of a Polyvinyl Alcohol ("PVA") film, and the passivation layer 24 is formed by forming a hard coating or an anti-reflective treatment on one of the TAC films of the polarizer 22.

When only the λ/4 plate 25 is formed between the polarizer 22 and the color filter display panel 200, the thickness is reduced compared with alternative arrangements, as will be described as follows.

With reference to FIG. 4, the adhesive 26 between the λ/4 plate and the color filter display panel 200 has a thickness of 25 μm, the λ/4 plate has a thickness of 40 μm, the adhesive 23 has a thickness of 20 μm, and the polarizer 22 has a thickness of about 105 μm, which makes a total thickness of the section shown in FIG. 4 about 190 μm, excluding the passivation layer 24.

In the exemplary embodiment shown in FIG. 4, if a λ/2 plate with a thickness of 45 μm is additionally formed in the section, because an adhesive layer with a thickness of 20 μm should also be additionally formed to attach the λ/2 plate, then a total 65 μm is added to the section, thus making the thickness of the section greater than the section without the λ/2 plate.

When the λ/2 plate and the adhesive layer for attaching the λ/2 plate are applied to the color filter display panel 200 as well as the TFT array panel 100, a total thickness increase of 130 μm occurs.

Thus, the LCD having the structure of the present invention illustrated in FIGS. 1 to 4 becomes thinner by 130 μm as compared to LCDs additionally having the λ/2 plate, and the cost that may be incurred for forming the λ/2 plate can also be advantageously reduced.

Meanwhile, another exemplary embodiment as shown in FIG. 5 can also be implemented. FIG. 5 shows a structure in which the λ/4 plate is not formed as a separate film but is instead coated on one side of the polarizer 22.

The λ/4 plate 25-1 is coated on one surface of the polarizer 22 through the following process.

An alignment layer (not shown) is formed on one surface of the polarizer 22, on which a liquid crystal layer (not shown) is formed, and they are then hardened. Then, liquid crystals are aligned in an alignment direction of the alignment layer (not shown) to have characteristics of the λ/4 plate.

On the other surface of the polarizer 22, on which the λ/4 plate 25-1 is not coated, the passivation layer 24 is formed through hard coating or the anti-reflective treatment.

The adhesive 26 attaches the section shown in FIG. 5 to the color filter display panel 200.

The layers in the exemplary embodiment shown in FIG. 5 have the following thicknesses.

The polarizer 22 has a thickness of 105 μm, the lower coated λ/4 plate 25-1 has a thickness of 5 μm, and the lower adhesive 26 has a thickness of 25 μm, for a total of 135 μm, excluding the passivation layer 24. Compared with the structure of FIG. 4 having the total thickness of 190 μm, the total thickness of 135 μm in FIG. 5 is smaller by 55 μm. Consequently, in terms of the total thickness when considering the sections on both the color filter display panel 200 and the TFT array panel 100, the LCD according to the exemplary embodiment of FIG. 5 is advantageously smaller by 110 μm as compared to the LCD according to the exemplary embodiment of FIG. 4, and is smaller by 240 μm as compared to the LCD additionally including a λ/2 plate on each section.

Figure 6:
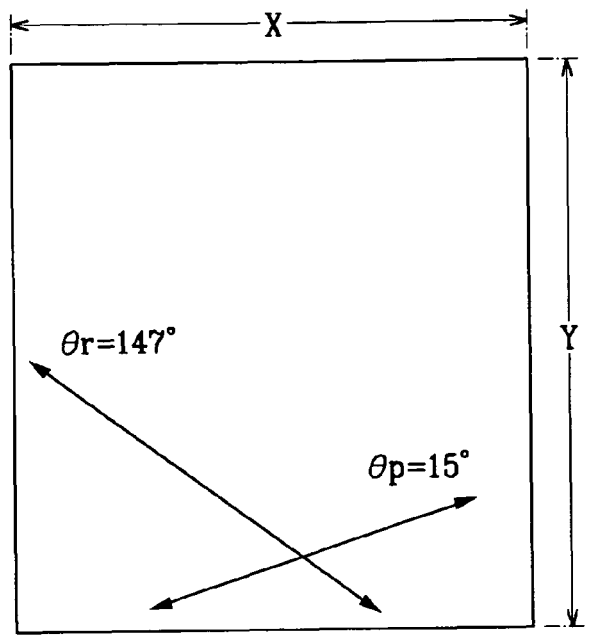
FIG. 6 is a drawing illustrating an angle relationship between the exemplary polarizer and the exemplary λ/4 plate of an exemplary color filter display panel according to an exemplary embodiment of the present invention.
Figure 7:
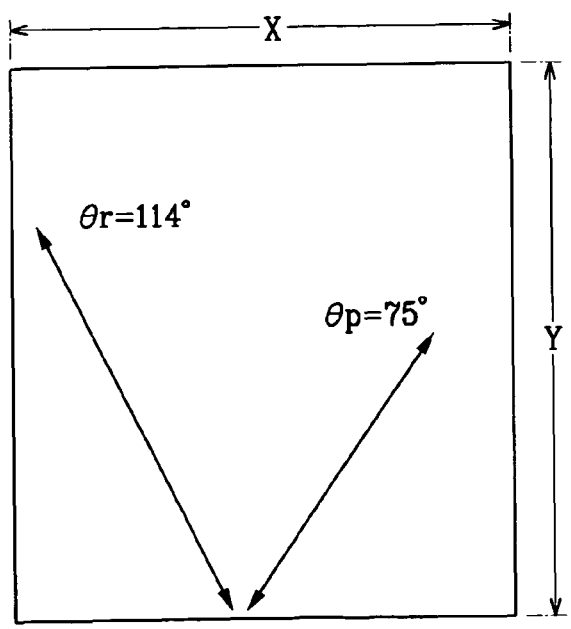
FIG. 7 is a drawing illustrating an angle relationship between the exemplary polarizer and the exemplary λ/4 plate of an exemplary thin film transistor ("TFT") array panel according to an exemplary embodiment of the present invention.

Preferably, the layered structures shown in FIGS. 4 and 5 have an angle relationship as shown in FIGS. 6 and 7. Because the LCD that includes a λ/2 plate on each section improves the color compensation and display characteristics by using the λ/2 plate as well as the λ/4 plate, in exemplary embodiments of the present invention with the λ/2 plate omitted, the exemplary embodiments of the present invention utilize the below described angle relationship to ensure improved color compensation and display characteristics. FIG. 6 shows an angle relationship of the color filter display panel 200, and FIG. 7 shows an angle relationship of the TFT array panel 100.

The angle relationship of the color filter display panel will first be described.

FIG. 6 is a drawing illustrating an angle relationship between the exemplary polarizer and the exemplary λ/4 plate of the exemplary color filter display panel according to an exemplary embodiment of the present invention.

In FIG. 6, θp indicates a direction of an absorption axis of the polarizer 22, and θr indicates a direction of a slow axis of the λ/4 plate 25.

The absorption axis of the polarizer 22 indicates a direction in which light of the corresponding direction is absorbed so as not to be transmitted, and the slow axis of the λ/4 plate 25 is a direction in which light of the corresponding direction proceeds slowly to change a phase.

FIG. 6 shows the angle when the structure is observed from the top in a state that the color filter display panel 200 is formed at the lower side, the λ/4 plate 25 is formed on the color filter display panel 200, and the polarizer 22 is formed on the λ/4 plate 25. The angle shown in FIG. 6 was measured based on the X-axis three o'clock direction.

As shown in FIG. 6, the absorption axis of the polarizer 22 is at 15 degrees, and the slow axis of the λ/4 plate 25 is at 147 degrees, both with respect to the X-axis. Herein, a phase difference value (Δnd) of the λ/4 plate 25 is 155 nm when the wavelength of light is 550 nm. However, the above-described values may have the following ranges in consideration of potential error. The absorption axis of the polarizer 22 may be at 15±10 degrees, the slow axis of λ/4 plate 25 may be at 147±10 degrees, and the phase difference value (Δnd) may be 155 nm±+20 nm when the wavelength of light is 550 nm.

The angles θp and θr were obtained from results of experimentation with respect to liquid crystal in which a cell gap was 4.1 μm with respect to a one o'clock direction of a viewing angle and a Δn value of liquid crystal of 0.067. In the liquid crystal, when an error is taken into consideration, an applicable viewing angle of liquid crystal is ±40 degrees from a one o'clock direction, and a skew angle of liquid crystal is within the range of 0 degrees to 20 degrees and determined by an alignment angle of the alignment layer of the upper and lower display panels.

The angle relationship of the TFT array panel will now be described as follows.

FIG. 7 is a drawing illustrating an angle relationship between the exemplary polarizer and the exemplary λ/4 plate of the exemplary TFT array panel according to an exemplary embodiment of the present invention.

FIG. 7 shows an angle relationship between the polarizer 12 and the λ/4 plate 15 viewed from the bottom in a state that the TFT array panel 100 is formed at the upper surface, the λ/4 plate 15 is formed at a lower side of the TFT array panel 100, and the polarizer 12 is formed at the lower side of the λ/4 plate 15. The angle shown in FIG. 7 was measured based on the X-axis three o'clock direction.

As shown in FIG. 7, an absorption axis of the polarizer 12 is at 75 degrees, and a slow axis of the λ/4 plate 15 is at 114 degrees, with respect to the X-axis. Herein, a phase difference value (Δnd) of the λ/4 plate 15 is 135 nm when the wavelength of light is 550 nm. However, the above values may have the following ranges in consideration of potential error. The absorption axis of the polarizer 12 may be at 75±10 degrees, and the slow axis of the λ/4 plate 15 may be at 114±10 degrees, and in this case, a phase difference value (Δnd) of the λ/4 plate 15 may be 135±20 nm when the wavelength of light is 550 nm.

The angles θp and θr of FIG. 7 were obtained from results of experimentation with respect to liquid crystal, in which a cell gap was 4.1 μm with respect to a one o'clock direction of a viewing angle and a Δn value of liquid crystal was 0.067. In the LCD, when an error is taken into consideration, an applicable skew angle of liquid crystal is within the range of 0 degrees to 20 degrees and a viewing angle of the liquid crystal is ±40 degrees from the one o'clock direction.

The angles shown in FIG. 7 are based on a different reference angle from those shown in FIG. 6 after the LCD is fabricated. That is, the angles were measured based on the direction in which the display panels 100 and 200 are viewed from the polarizers 12 and 22, so one of them should be changed. After the LCD is fabricated, when the angles shown in FIG. 7 are corrected to those viewed from the side of the color filter display panel 200 so as to be the same as the angles shown in FIG. 6, the angles shown in FIG. 7 can be changed as follows.

That is, as shown in FIG. 7, the absorption axis of the polarizer 12 is at 105 degrees (180 degrees–75 degrees) and the slow axis of the λ/4 plate 15 is at 66 degrees (180 degrees–114 degrees). However, the values can have the following ranges in consideration of potential error. The absorption axis of the polarizer 22 may be at 105±10 degrees, and the slow axis of the λ/4 plate 25 may be at 66±10 degrees. These angles correspond to the reference direction as shown in FIG. 6 when the LCD is fabricated. Alternatively, the angle relationships as shown in FIG. 6 may be changed to correspond with the angles shown in FIG. 7, such as, θp=165 degrees and θr=33 degrees. In other words, a change in a reference direction would correspondingly change the values of θp and θr.

When the above-described angle relationships are used, the characteristics of the LCD can be improved to as good as the case where the λ/2 plate is added as in the related art. The characteristics of the LCD according to exemplary embodiments of the present invention will now be described.

Figure 8:
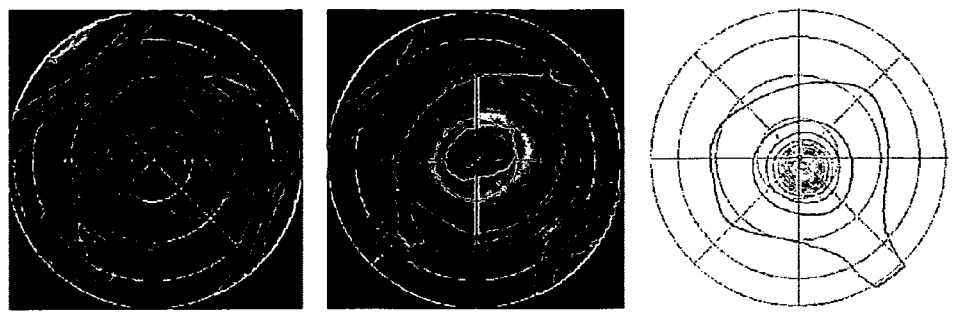
FIG. 8 shows results obtained by measuring a viewing angle under a transflective condition of the related art.
Figure 9:
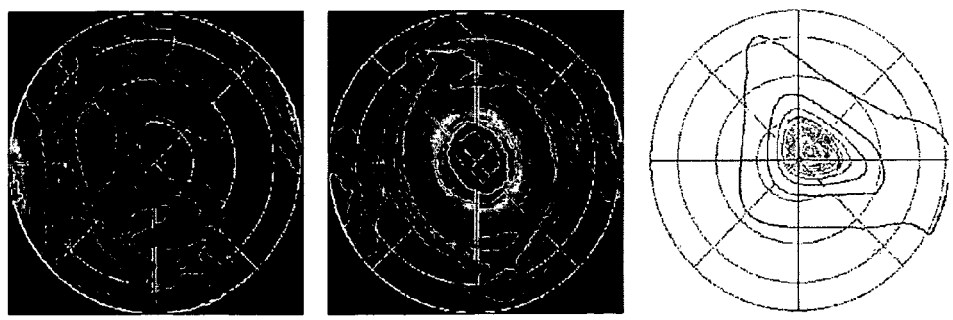
FIG. 9 shows results obtained by measuring a viewing angle under a transflective condition according to exemplary embodiments of the present invention.

FIG. 8 shows results obtained by measuring a viewing angle under a transflective condition of the related art, and FIG. 9 shows results obtained by measuring a viewing angle under a transflective condition according to an exemplary embodiment of the present invention.

FIG. 8 shows a case where the λ/2 plate and the λ/4 plate are used together, and FIG. 9 shows a case where only the λ/4 plate is used, in which each viewing angle of the LCD was measured based on the angle relationships shown in FIGS. 6 and 7. In FIGS. 8 and 9, the left pictures show viewing angles in a transmission mode and the right pictures show viewing angles in a reflection mode. As shown in FIGS. 8 and 9, it is noted that the LCD using only the λ/4 plate according to the present invention has viewing angles as in the related art LCD. Thus, even though the λ/2 plate is not included in the LCD of FIG. 9, display characteristics are maintained while reducing an overall thickness of the LCD.

The pictures of FIG. 9 will be further described with reference to FIG. 10.

Figure 10:
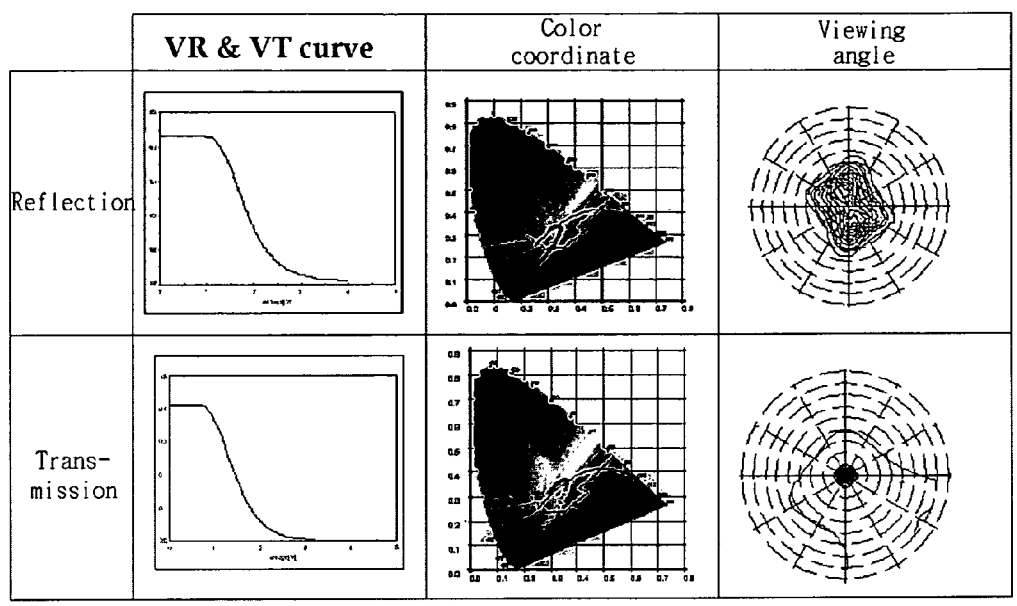
FIG. 10 shows results of simulation of the exemplary LCD according to exemplary embodiments of the present invention.

FIG. 10 shows results of simulation of the LCD according to an exemplary embodiment of the present invention. From the left, there are shown curved lines of luminance according to voltages, color coordinates, and viewing angles in a reflection mode and in a transmission mode. Accordingly, as shown in FIG. 10, it is demonstrated that although only a λ/4 plate is used, instead of both a λ/4 plate and a Aλ/2 plate, sufficient V-T curved lines, color coordinates, and viewing angles can be obtained.

Figure 11:
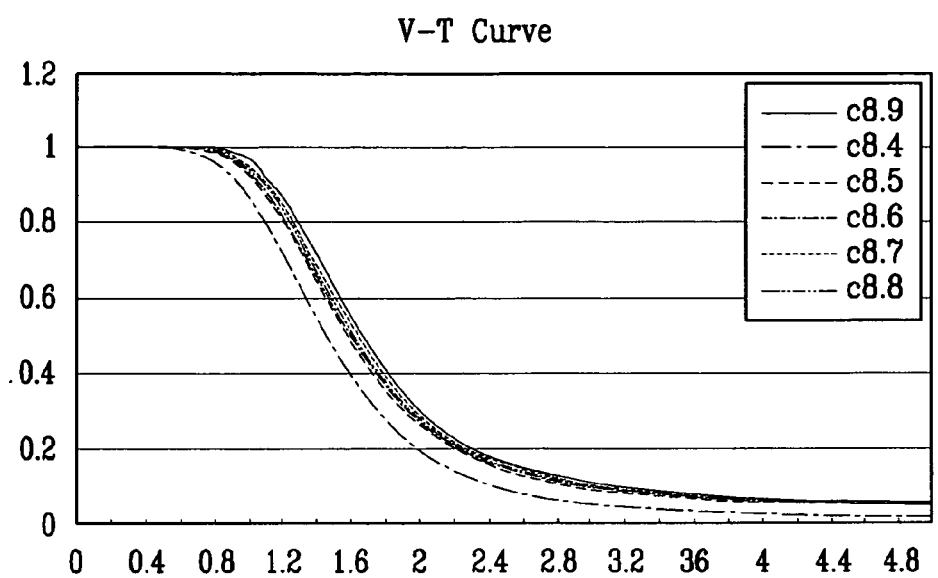
FIGS. 11 and 12 are graphs showing transmittance and reflection curves, respectively, according to voltages applied to liquid crystal.
Figure 12:
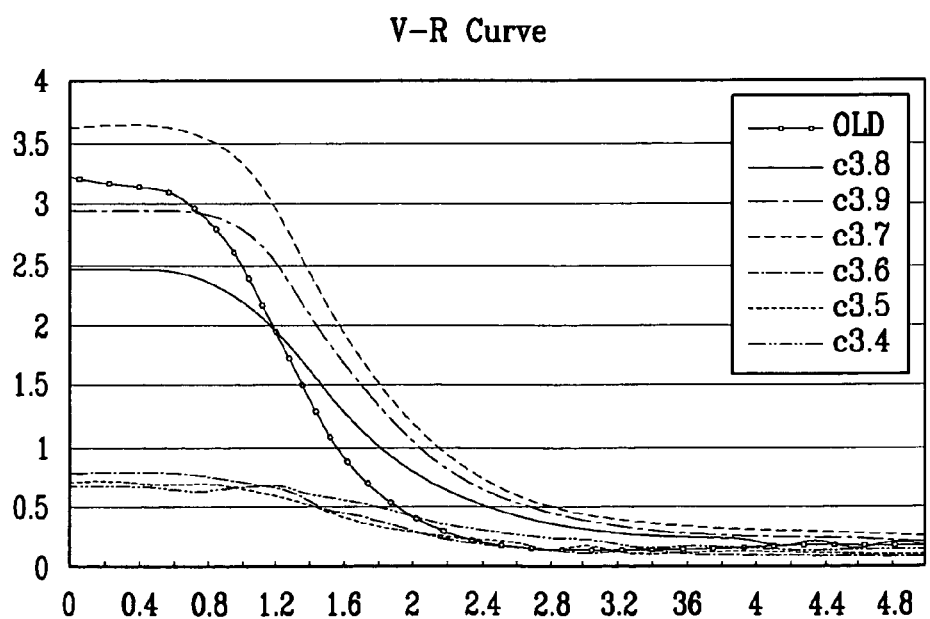
Figure 13:
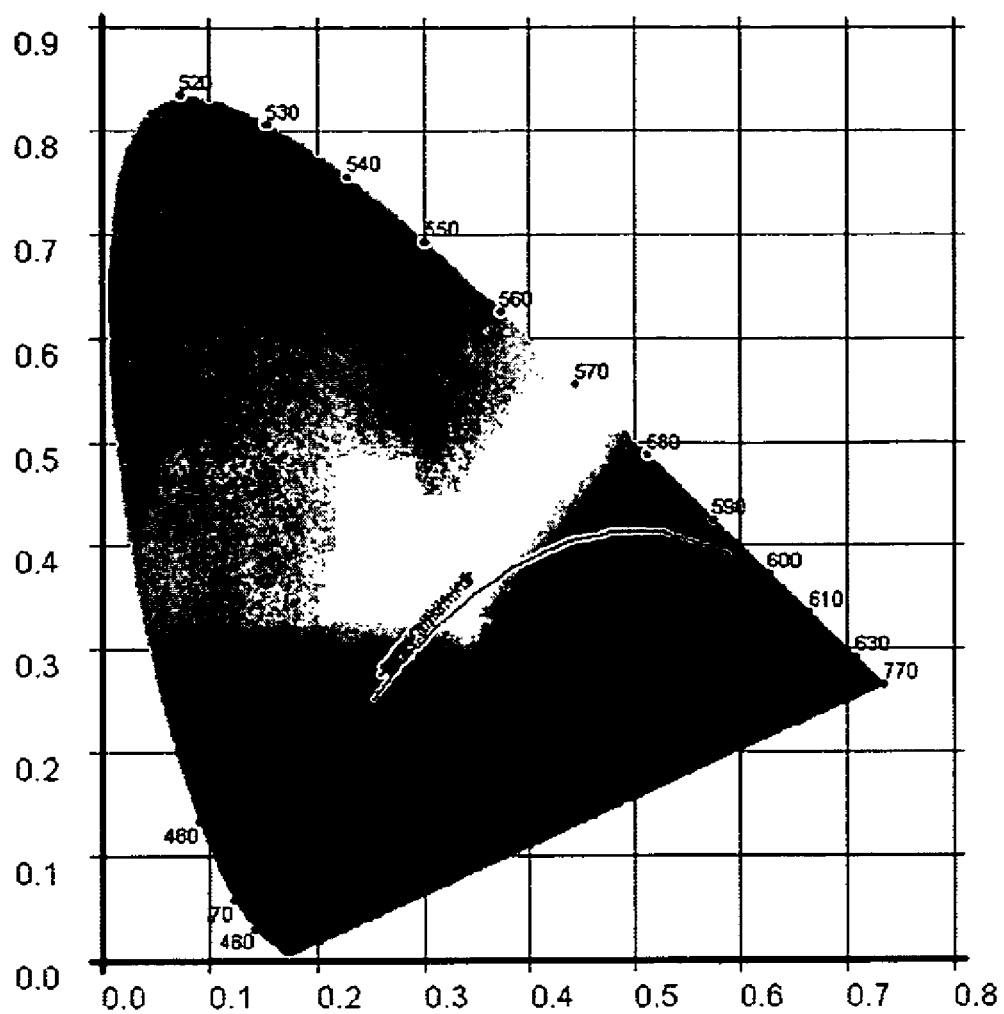
FIG. 13 is a drawing illustrating color coordinates in FIGS. 11 and 12.

FIGS. 11 and 12 are graphs showing curves of luminance according to voltages measured by changing a cell gap of liquid crystal in a transmission mode (FIG. 11) and in a reflection mode (FIG. 12). FIG. 13 is a drawing illustrating color coordinates in FIGS. 11 and 12.

As shown in FIGS. 11 and 12, as the cell gap of liquid crystal is changed, its transmission/reflection characteristics are varied. In this case, the reflection mode is changed more sensitively than the transmission mode with respect to the cell gap, and in consideration of the reflection mode, the cell gap is preferably 3.7 μm.

As stated above, in the transflective LCD of the exemplary embodiments described above, only the λ/4 plate is formed between the polarizer and the display panel, and the directions of the absorption axis of the polarizer and the slow axis of the λ/4 plate are set to thereby have the same or better characteristics compared with the related art transflective LCD in which the λ/2 plate and λ/4 plate are used together, and thus the thickness and/or production cost can be reduced.

An LCD according to another exemplary embodiment of the present invention will be described with reference to FIGS. 14 to 16.

Figure 14:
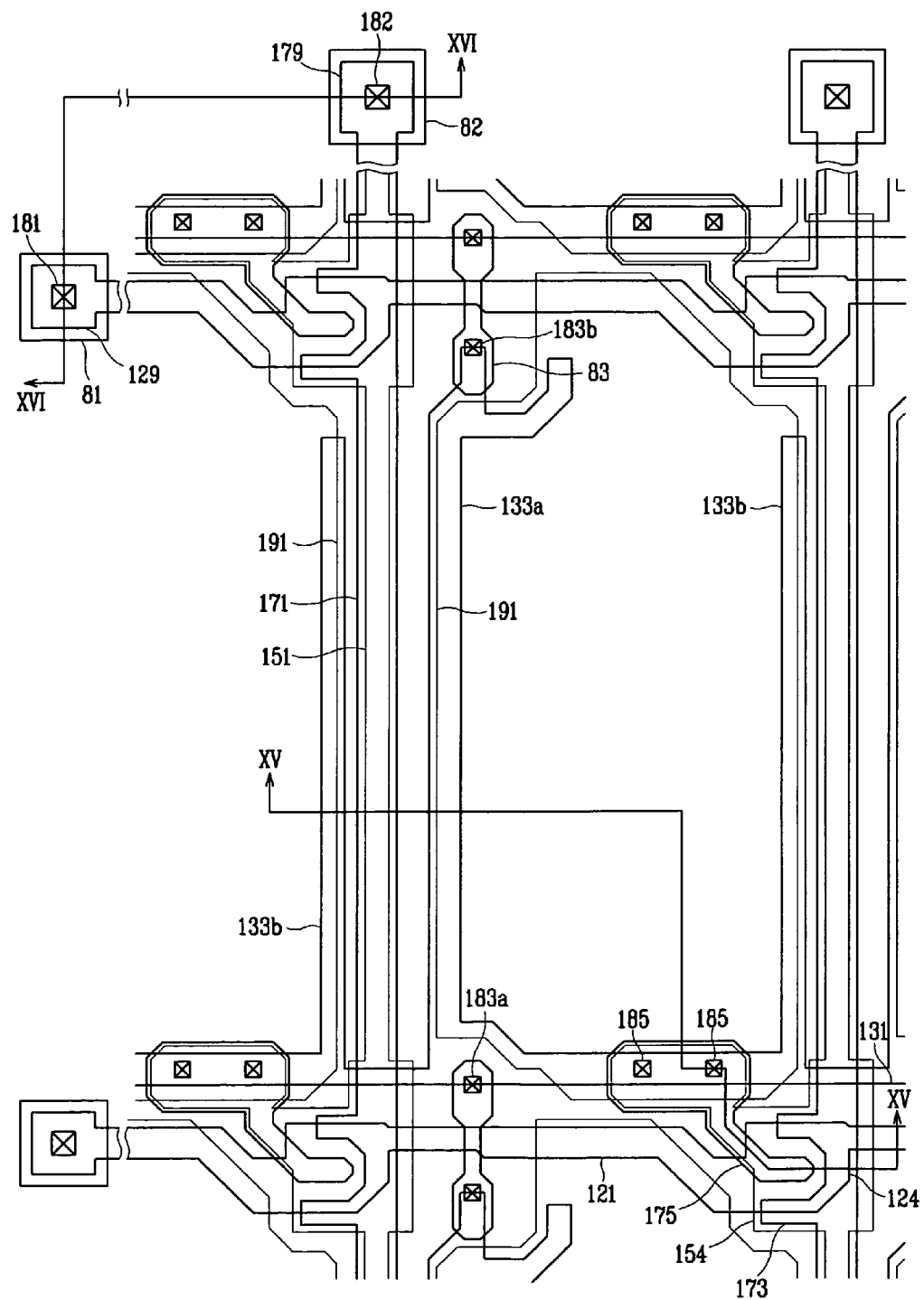
FIG. 14 is a layout view of an exemplary LCD according to another exemplary embodiment of the present invention.
Figure 15:
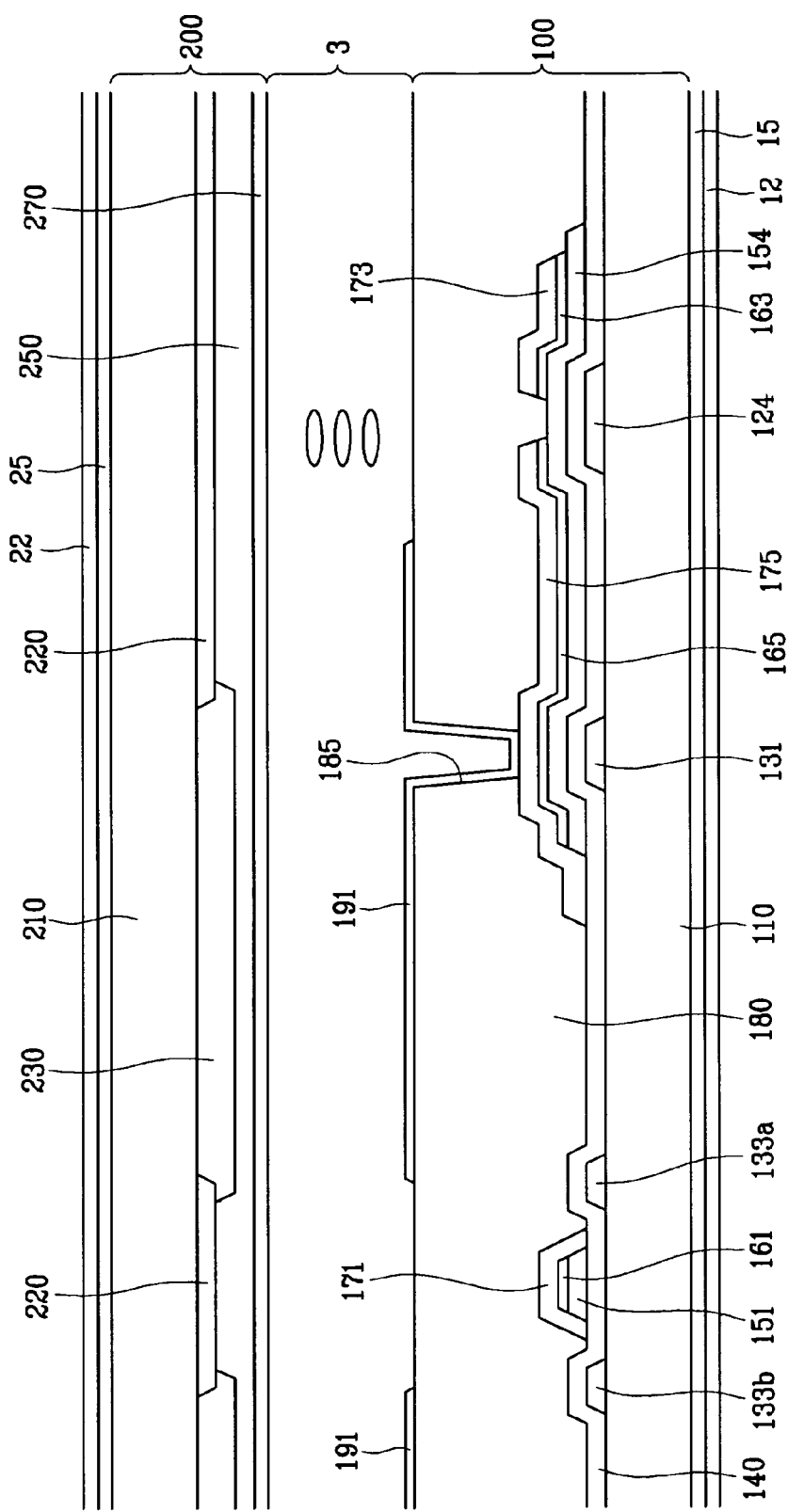
FIGS. 15 and 16 are cross-sectional views taken along lines XV-XV and XVI-XVI of the exemplary LCD in FIG. 14, respectively.
Figure 16:
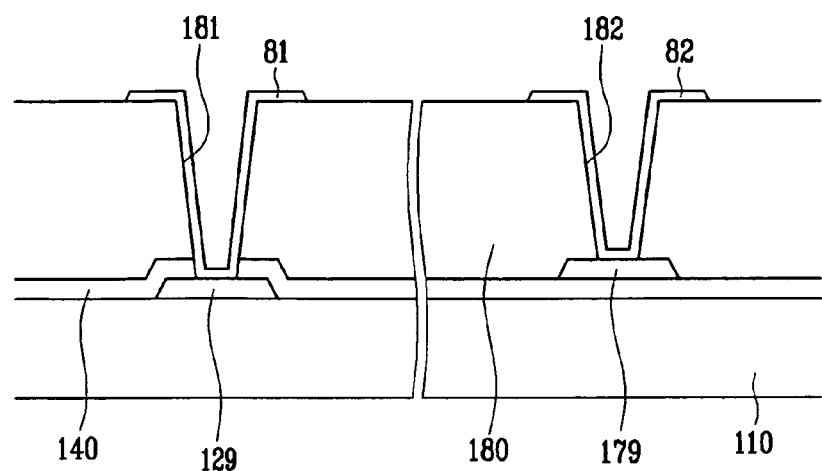

FIG. 14 is a layout view of an exemplary LCD according to another exemplary embodiment of the present invention, and FIGS. 15 and 16 are cross-sectional views taken along lines XV-XV and XVI-XVI of the LCD in FIG. 14, respectively.

A plurality of gate lines 121 and a plurality of storage electrode lines 131 are formed on an insulation substrate 110 made of transparent glass or plastic, etc. The gate lines 121 transfer gate signals and extend mainly in a horizontal direction, a first direction. Each gate line 121 includes a plurality of gate electrodes 124 that are protruded upward toward an adjacent gate line 121, and an end portion 129 with a large area for connection with a different layer or an external driving circuit. A gate driving circuit (not shown) that generates a gate signal can be mounted on a flexible printed circuit film (not shown) attached on the substrate 110, directly mounted on the substrate 110, or integrated with the substrate 110. When the gate driving circuit is integrated with the substrate 110, the gate line 121 can be elongated to be directly connected therewith.

The storage electrode line 131 receives a predetermined voltage and includes a branch line that extends substantially in parallel to the gate line 121 and pairs of first and second storage electrodes 133a and 133b branched from the branch line and extending substantially perpendicular to the branch line. The first and second storage electrodes 133a and 133b may be disposed between an adjacent pair of data lines 171, as will be further described below. Each storage electrode line 131 is positioned between two adjacent gate lines 121, and the branch line is closer to the lower one of the two gate lines 121. The storage electrodes 133a and 133b include a fixed end connected with the branch line and a free end positioned at the opposite side, respectively. The fixed end of the first storage electrode 133a has a large area and the free end is bifurcated into a linear portion and a curved portion. However, the storage electrode line 131 can be modified to have various shapes and dispositions.

The gate line 121 and the storage electrode line 131 can be made of an aluminum group metal such as aluminum (Al) or an aluminum alloy, a silver group metal such as silver (Ag) or a silver alloy, a copper group metal such as copper (Cu) or a copper alloy, a molybdenum group metal such as molybdenum (Mo) or a molybdenum alloy, chromium (Cr), tantalum (Ta) and titanium (Ti), etc. In this respect, however, the gate line 121 and the storage electrode line 131 can have a multi-layer structure including two conductive layers (not shown), each having different physical properties.

The side of the gate line 121 and the side of the storage electrode line 131 are sloped with respect to the surface of the substrate 110, and preferably, the slope angle is within the range of about 30 degrees to about 80 degrees.

A gate insulating layer 140 made of silicon nitride (SiNx) or silicon oxide (SiOx), etc., is formed on the gate line 121 and the storage electrode line 131, and on exposed portions of the insulating substrate 110.

A plurality of semiconductor stripes 151 made of hydrogenated a-Si or polycrystalline silicon, etc., are formed on the gate insulating layer 140. The semiconductor stripes 151 mainly extend in a vertical direction, a second direction substantially perpendicular to the first direction, and include a plurality of projections 154 projected toward the gate electrode 124. The semiconductor stripes 151 are increased in width near the gate lines 121 and the storage electrode lines 131 to extensively cover them.

A plurality of ohmic contact stripes 161 and a plurality of ohmic contact islands 165 are formed on the semiconductor stripes 151. The ohmic contact stripes 161 and the ohmic contact islands 165 can be made of a material such as n+ hydrogenated a-Si in which an n-type impurity such as phosphor is doped with high density, or they can be made of silicide. The ohmic contact stripes 161 include a plurality of projections 163, and each projection 163 and ohmic contact island 165 are arranged as a pair on the projection 154 of the semiconductor stripe 151.

The sides of the semiconductor stripe 151 and projection 154 and the sides of the ohmic contact stripes and islands 161 and 165 are also sloped with respect to the surface of the substrate 110, and the slope angle is within the range of about 30 degrees to about 80 degrees.

A plurality of data lines 171 and a plurality of data electrodes 175 are formed on the ohmic contact stripes and islands 161 and 165 and the gate insulating layer 140.

The data lines 171 transfer data signals and mainly extend in a vertical direction, the second direction, to cross the gate lines 121. Each data line 171 crosses a storage electrode line 131 and runs between the set of adjacent storage electrodes 133a and 133b from adjacent pixels. Each data line 171 includes a plurality of source electrodes 173 extending toward the gate electrodes 124, and an end portion 179 with a large area for connection with a different layer or an external driving circuit. A data driving circuit (not shown) for generating a data signal can be mounted on a flexible printed circuit film (not shown) attached on the substrate 110, can be directly mounted on the substrate 110, or can be integrated with the substrate 110. In the case where the data driving circuit is integrated with the substrate 110, the data line 171 can be elongated to be connected therewith.

The drain electrode 175 is separated from the data line 171 and faces the source electrode 173 centering on the gate electrode 124. Each drain electrode 175 includes one large end portion and one bar-shaped end portion. The large end portion overlaps the storage electrode line 131, and the bar-shaped end portion is partially surrounded by the bent source electrode 173.

One gate electrode 124, one source electrode 173, and one drain electrode 175 constitute a TFT together with the projection 154 of the semiconductor stripe 151, and a channel of the TFT is formed at the projection 154 between the source electrode 173 and the drain electrode 175.

Preferably, the drain line 171 and the drain electrode 175 are made of a refractory metal such as molybdenum Mo, chromium Cr, tantalum Ta, and titanium Ti, etc., or their alloy, and can have a multi-layer structure including a refractory metal layer (not shown) and a low-resistance conductive layer (not shown). Examples of the multi-layer structure can include a double-layer of a lower chromium Cr or molybdenum Mo (alloy) layer and an upper aluminum Al (alloy) layer, and a triple-layer of a lower molybdenum Mo (alloy) layer, an intermediate aluminum Al (alloy) layer, and an upper molybdenum Mo (alloy) layer. While some examples have been provided, the data line 171 and the drain electrode 175 can be made of various other metals or conductors.

Preferably, the side of the data line 171 and the side of the drain electrode 175 are sloped with respect to the surface of the substrate 110 at a slope angle ranging from about 30 degrees to about 80 degrees.

The ohmic contact stripes and islands 161 and 165 exist only between the lower semiconductor stripes 151 and projections 154 and the upper data line 171 and the drain electrode 175 to lower contact resistance there between. The greater portion of the semiconductor stripes 151 are narrower than the data line 171, but as aforementioned, the portion of the semiconductor stripe 151 that meets the gate line 121 has a large width, smoothing a profile of the surface, to thereby prevent a disconnection of the data line 171. Some portions of the semiconductor stripe 151 and projection 154, including, for example, the portion between the source electrode 173 and the drain electrode 175, are exposed without being covered by the data line 171 and the drain electrode 175.

A passivation layer 180 is formed on the data line 171, the drain electrode 175, and the exposed portion of the semiconductor stripe 151 and the projection 154, as well as on exposed portions of the gate insulating layer 140. The passivation layer 180 is made of an inorganic insulator or an organic insulator, etc., and may have a planarized surface. Examples of the inorganic insulator are silicon nitride and silicon oxide. The organic insulator may have photosensitivity, and preferably, its dielectric constant is not greater than about 4.0. In this respect, the passivation layer 180 may also have a dual-layer structure of a lower inorganic layer and an upper organic layer so that it may not do harm to the exposed portion of the semiconductor stripe 151 and the projection 154 while still sustaining the excellent insulation characteristics of the organic layer.

At the passivation layer 180, there are formed a plurality of contact holes 182 and 185 exposing the end portion 179 of the data line 171 and the drain electrode 175, respectively, and at the passivation layer 180 and the gate insulating layer 140, there are formed a plurality of contact holes 181 exposing the end portion 129 of the gate line 121, a plurality of contact holes 183*a* exposing a portion of the storage electrode line 131 near the fixed end of the first storage electrode 133*a*, and a plurality of contact holes 183*b* exposing the projection of the free end of the first storage electrode 133*a*.

A plurality of pixel electrodes 191, a plurality of overpasses 83, and a plurality of contact assistants 81 and 82 are formed at an upper portion of the passivation layer 180. They can be made of the transparent conductive material such as ITO or IZO.

The pixel electrode 191 is physically and electrically connected with the drain electrode 175 through the contact hole or holes 185, and receives a data voltage from the drain electrode 175. Upon receiving the data voltage, the pixel electrode 191 generates an electric field together with a common electrode 270 of the color filter display panel 200 that receives a common voltage, to thereby determine a direction of liquid crystal molecules of the liquid crystal layer 3 between the two electrodes 191 and 270. Polarization of light that transmits through the liquid crystal layer 3 can be varied according to the determined direction of the liquid crystal molecules. The pixel electrode 191 and the common electrode 270 form a capacitor (referred to hereinafter as a 'liquid crystal capacitor') to sustain the applied voltages even after the TFT is turned off.

The pixel electrode 191 and the drain electrode 175 connected with the pixel electrode 191 overlap with the storage electrodes 133*a* and 133*b* and branch portion of the storage electrode line 131, and the left and right sides of the pixel electrode 191 are closer to the data line 171 than to the storage electrodes 133*a* and 133*b*. A capacitor formed by the pixel electrode 191 and the drain electrode 175 electrically connected with the pixel electrode 191 overlapping with the storage electrode line 131 is called a storage capacitor, and the storage capacitor strengthens a voltage sustaining capability of the liquid crystal capacitor.

The contact assistants 81 and 82 are connected with the end portion 129 of the gate line 121 and the end portion 179 of the data line 171 through the contact holes 181 and 182, respectively. The contact assistants 81 and 82 complement bonding characteristics of the end portion 129 of the gate line 121 and the end portion 179 of the data line 171 with an external device, and protect them.

The overpass 83, traversing the gate line 121, is connected with the exposed portion of the branch portion of the storage electrode line 131 via the contact hole 183*a* and the exposed end portion of the free end of the storage electrode 133*a* via the contact hole 183*b* positioned at the other side of the gate line 121. The storage electrode line 131 including the storage electrodes 133*a* and 133*b* can be used together with the overpass 83 to repair a defect of the gate line 121, the data line 171, or the TFT.

The color filter display panel 200 will now be described.

A light blocking member 220 is formed on the insulation substrate 210 made of transparent glass or plastic, etc. The light blocking member 220, which is also called a black matrix, defines a plurality of openings facing the pixel electrode 191, and prevents light leakage between the pixel electrodes 191.

A plurality of color filters 230 are formed on the substrate 210, and are disposed to be received in the openings surrounded by the light blocking member 220. The color filter 230 can extend in a vertical direction along the pixel electrode 191 to form a stripe. Each color filter 230 can display one of three colors, such as red, green, and blue.

A planarization film 250 is formed on the color filter 230 and the light blocking member 220, on which a common electrode 270 is formed. Preferably, the common electrode 270 is made of a transparent conductor such as ITO or IZO.

An alignment layer (not shown) for aligning the liquid crystal layer 3 is formed on the inner sides of the display panels 100 and 200 to control an alignment direction of the liquid crystal layer 3. The liquid crystal layer 3 is formed of liquid crystals of electrically controlled birefringence ("ECB") mode and is horizontally laid between upper and lower alignment layers, such that liquid crystals are aligned in parallel therein without a rotation unlike twisted nematic ("TN") liquid crystals.

On the outer side of the display panels 100 and 200, $\lambda/4$ plates 15 and 25 and polarizers 12 and 22 are formed.

The upper and lower polarizers 22 and 12 have an absorption axis, they absorb polarization light corresponding to the absorption axis, and they cause polarization light that is perpendicular thereto to transmit therethrough, respectively. The upper and lower $\lambda/4$ plates 25 and 15, which are a type of phase difference film, have a slow axis and allow polarization light in a slow axis direction to be slower by $\lambda/4$ compared with polarization light perpendicular thereto.

Figure 17:
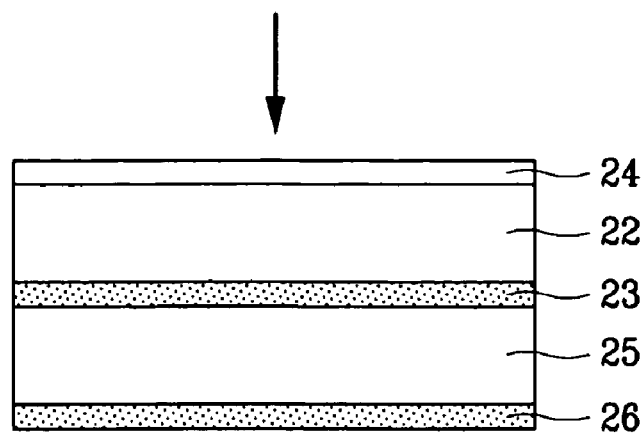
FIG. 17 is a drawing illustrating a section of exemplary films formed on an upper side of an exemplary color filter display panel.
Figure 18:
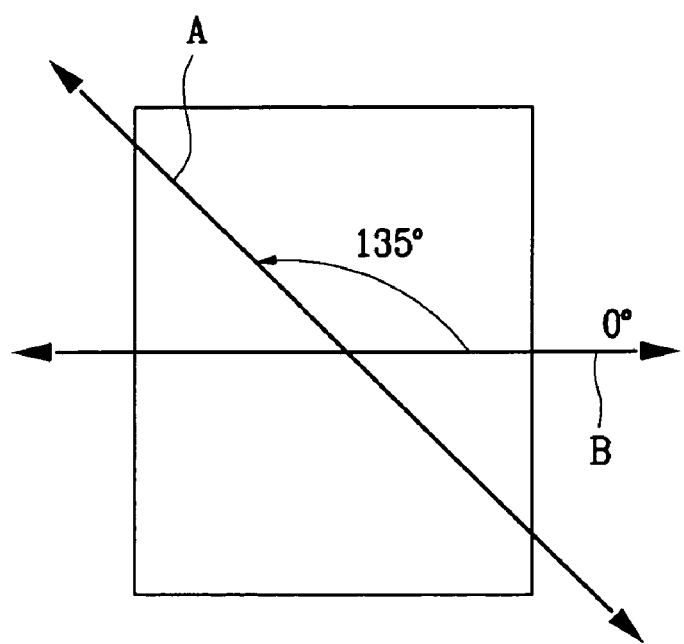
FIG. 18 is a drawing illustrating an angle relationship of exemplary upper films of the exemplary color filter display panel.
Figure 19:
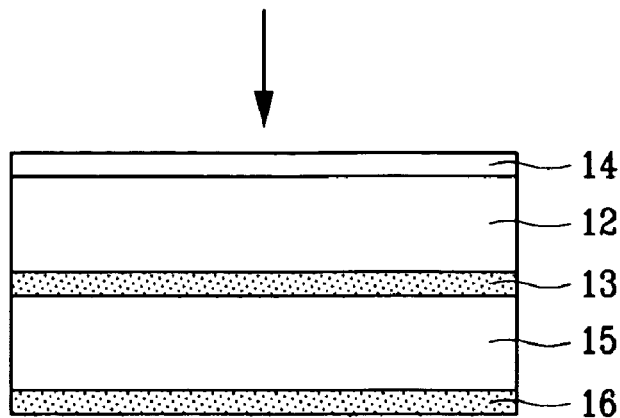
FIG. 19 is a drawing illustrating a section of exemplary films formed on a lower side of an exemplary TFT array panel.
Figure 20:
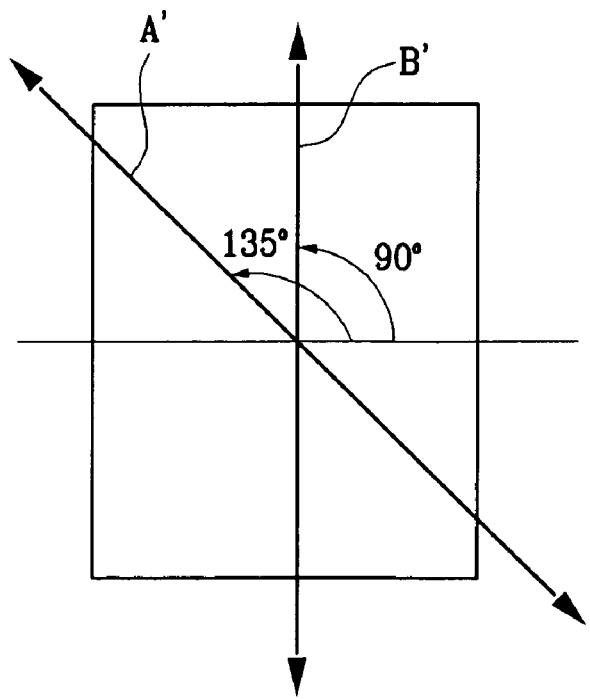
FIG. 20 is a drawing illustrating an angle relation of the exemplary lower films of the exemplary TFT array panel.

The films attached on the outer sides of the display panels 100 and 200 will be described in detail with reference to FIGS. 17 to 20. FIGS. 17 and 18 are drawings illustrating the exemplary films formed on the upper side of the exemplary color filter display panel 200, and FIGS. 19 and 20 are drawings illustrating the exemplary films formed at the lower side of the exemplary TFT array panel 100.

To begin with, the films attached on the upper side of the color filter display panel 200 will be described as follows. FIG. 17 is a drawing illustrating a section of exemplary films formed on the upper side of the exemplary color filter display panel.

The upper λ/4 plate 25 and the upper polarizer 22 are formed on the upper side of the color filter display panel 200, an adhesive 23 is used to attach the upper λ/4 plate 25 and the upper polarizer 22, and a lower adhesive 26 may be used to attach the upper insulation substrate 210 to the λ/4 plate 25. Meanwhile, a passivation layer 24 is formed at an outer side of the upper polarizer 22 to protect the upper polarizer 22 and the color filter display panel 200.

As the upper λ/4 plate 25, a film such as Zeonor® (made by Zeon Corporation) or a non-reflective ("NR") film can be used. Generally, the upper polarizer 22 has such a structure that a TAC film is attached at both sides of a PVA film, and the passivation layer 24 is formed through an anti-glaring, anti-reflection, anti-scratching, or hard coating treatment, etc.

FIG. 18 is a drawing illustrating an angle relationship of the exemplary upper films of the exemplary color filter display panel. FIG. 18 shows the angle when the structure is viewed from the top in a state such that the color filter display panel 200 is formed at the lower side and the films are formed on the color filter display panel 200. The angles shown in FIG. 18 were measured based on the three o'clock direction.

With reference to FIG. 18, a line 'A' indicates a direction of an absorption axis of the upper polarizer 22, and a line 'B' indicates a direction of a slow axis of the upper λ/4 plate 25. That is, the absorption axis of the upper polarizer 22 is at 135 degrees from the three o'clock direction in the counterclockwise direction, and the slow axis of the upper λ/4 plate 25 is in the three o'clock direction (0 degrees from the three o'clock direction). Herein, a phase difference value (Δnd) of the upper λ/4 plate 25 is 135 nm when the wavelength of light is 550 nm. Preferably, Zeonor is used as the upper λ/4 plate 25.

The films attached on the lower side of the TFT array panel 100 will be described as follows. FIG. 19 is a drawing illustrating a section of exemplary films formed on the lower side of the exemplary TFT array panel.

The lower λ/4 plate 15 and the lower polarizer 12 are formed on the lower side of the TFT array panel 100, an adhesive 13 is used to attach the lower λ/4 plate 15 and the lower polarizer 12, and an adhesive 16 may be used to attach the lower insulation substrate 110 to the λ/4 plate 15. A passivation layer 14 is formed on an outer side of the lower polarizer 12 to protect the lower polarizer 12 and the TFT array panel 100.

As the lower λ/4 plate 15, the film such as Zeonor or an NR film can be used. Generally, the lower polarizer 12 has such a structure in which a TAC film is attached at both sides of a PVA film, and the passivation layer 14 for protecting the lower polarizer 12 is formed through an anti-glaring, anti-reflection, anti-scratching, or hard coating treatment, etc.

FIG. 20 is a drawing illustrating an angle relationship of the exemplary lower films of the exemplary TFT array panel. FIG. 20 shows the angle when the structure is viewed from the top in a state in which the TFT array panel 100 is formed at the lower side and the films are attached on the TFT array panel 100. The angles shown in FIG. 20 were measured based on the three o'clock direction.

With reference to FIG. 20, the line 'A" indicates a direction of an absorption axis of the lower polarizer 12, and the line 'B" indicates a direction of a slow axis of the lower λ/4 plate 15. That is, the absorption axis of the upper polarizer 12 is at 135 degrees from the three o'clock direction in a counterclockwise direction, and the slow axis of the lower λ/4 plate 15 is in the twelve o'clock direction after having been rotated by 90 degrees from the three o'clock direction. Herein, a phase difference value (Δnd) of the lower λ/4 plate 15 is 100 nm when the wavelength of light is 550 nm. Preferably, as the lower λ/4 plate 15, the NR film is used.

Table 1 shows the phase differences Δnd, angle relationships, and the materials used in FIGS. 17 to 20 according to exemplary embodiments of the present invention.

TABLE 1

| | Films | Δnd (at 550 nm wavelength) | Angle | Material |
|---|---|---|---|---|
| Color filter display panel | Polarizer | None | 135 | Any |
| | Film 1 (λ/4) | 135 nm | 0 | Zeonor |
| TFT array panel | Polarizer | None | 135 | Any |
| | Film 1(λ/4) | 100 nm | 90 | NR film |

Figure 21:
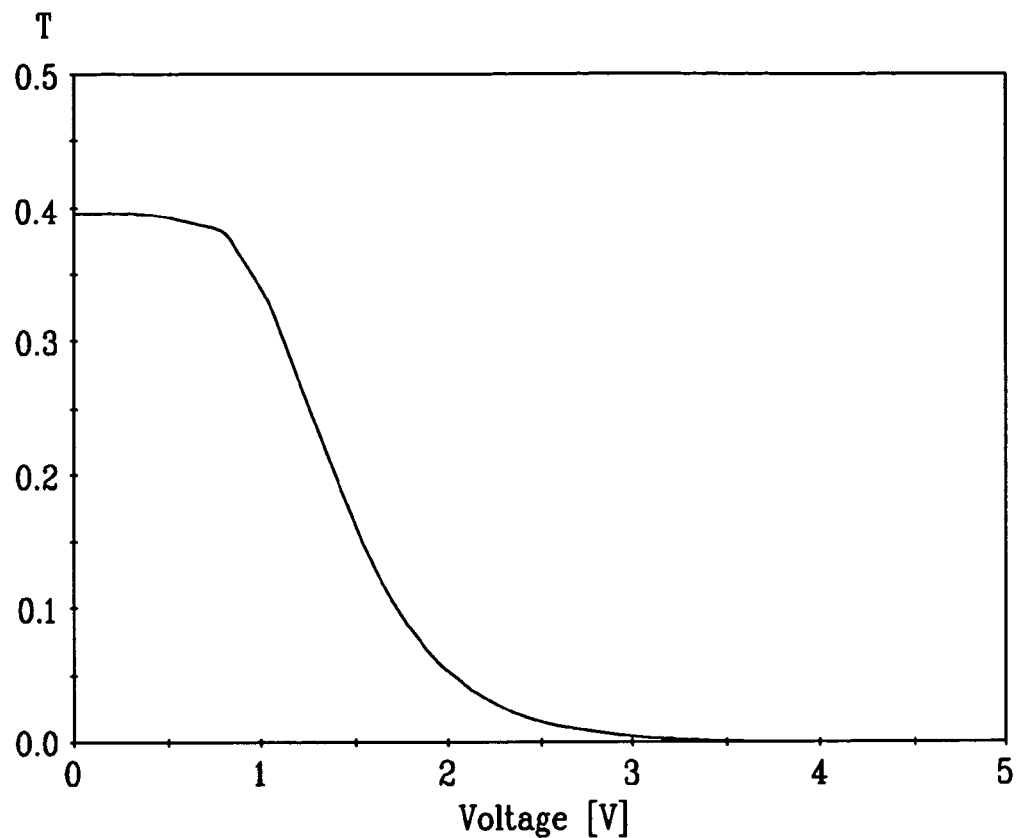
FIG. 21 is a graph showing a curve representing transmittance according to an applied voltage in the exemplary LCD according to exemplary embodiments of the present invention.
Figure 22:
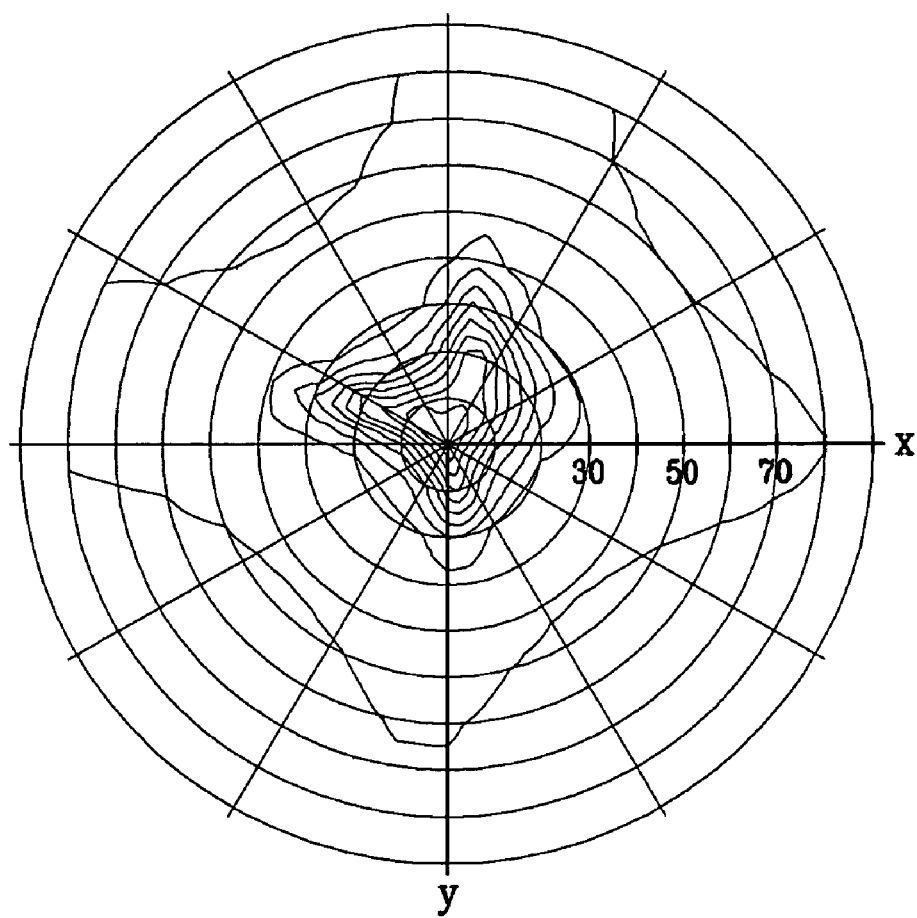
FIG. 22 is a drawing illustrating viewing angles of the exemplary LCD according to exemplary embodiments of the present invention.

Table 2 and FIGS. 21 and 22 show results obtained by measuring transmittance (T), contrast ratio (CR), color coordinates, and phase difference values (Δnd) by controlling the cell gap according to exemplary embodiments of the present invention.

TABLE 2

| | | | White color | | |
|---|---|---|---|---|---|
| Cell gap | T | CR | x | y | Δnd |
| 3.5 | 0.36230 | 1381.69871 | 0.28595 | 0.31064 | 235.2 |
| 3.6 | 0.37446 | 1752.12954 | 0.28884 | 0.31449 | 241.9 |
| 3.7 | 0.38571 | 2020.79029 | 0.29185 | 0.31845 | 248.6 |
| 3.8 | 0.39598 | 2044.61048 | 0.29501 | 0.32254 | 255.3 |
| 3.9 | 0.40523 | 1824.38282 | 0.29830 | 0.32675 | 262.1 |
| 4.0 | 0.41339 | 1496.70325 | 0.30175 | 0.33110 | 268.8 |

FIG. 21 is a graph showing a curve representing transmittance according to an applied voltage in the exemplary LCD according to an exemplary embodiment of the present invention, and FIG. 22 is a drawing illustrating viewing angles of the exemplary LCD according to an exemplary embodiment of the present invention.

The curve representing transmittance and the viewing angles as shown in FIGS. 21 and 22 are obtained when the cell gap is 3.8 in Table 2, which are sufficient transmittance and viewing angles (80/60/80/80 degrees at up/down/left/right portions).

With reference to FIGS. 17 to 19, when an error is taken into consideration, the polarizers 12 and 22 and the λ/4 plates 15 and 25 can have the following ranges.

The absorption axis of the upper polarizer 22 may be at 135±10 degrees from the three o'clock direction to the counterclockwise direction, and the slow axis of the upper λ/4 plate 25 may be at ±10 degrees based on the three o'clock direction (0 degrees). The phase difference value (Δnd) of the upper λ/4 plate 25 may be 135±20 nm when the wavelength of light is 550 nm. The absorption axis of the lower polarizer 12 may be at 135±10 degrees from the three o'clock direction in the counterclockwise direction, and the slow axis of the lower λ/4 plate 15 may be at ±10 degrees based on the twelve o'clock direction (90 degrees) after having been rotated by 90 degrees from the three o'clock direction. The phase difference value (Δnd) of the lower λ/4 plate 15 may be 100±20 nm when the wavelength of light is 550 nm.

In the above exemplary embodiments of the present invention, the polarizers 12 and 22 and the λ/4 plates 15 and 25 are attached on opposite sides of the ECB mode LCD.

In the following exemplary embodiment of the present invention, formation of a λ/2 plate in addition to the polarizer and the λ/4 plate will be described.

Figure 23:
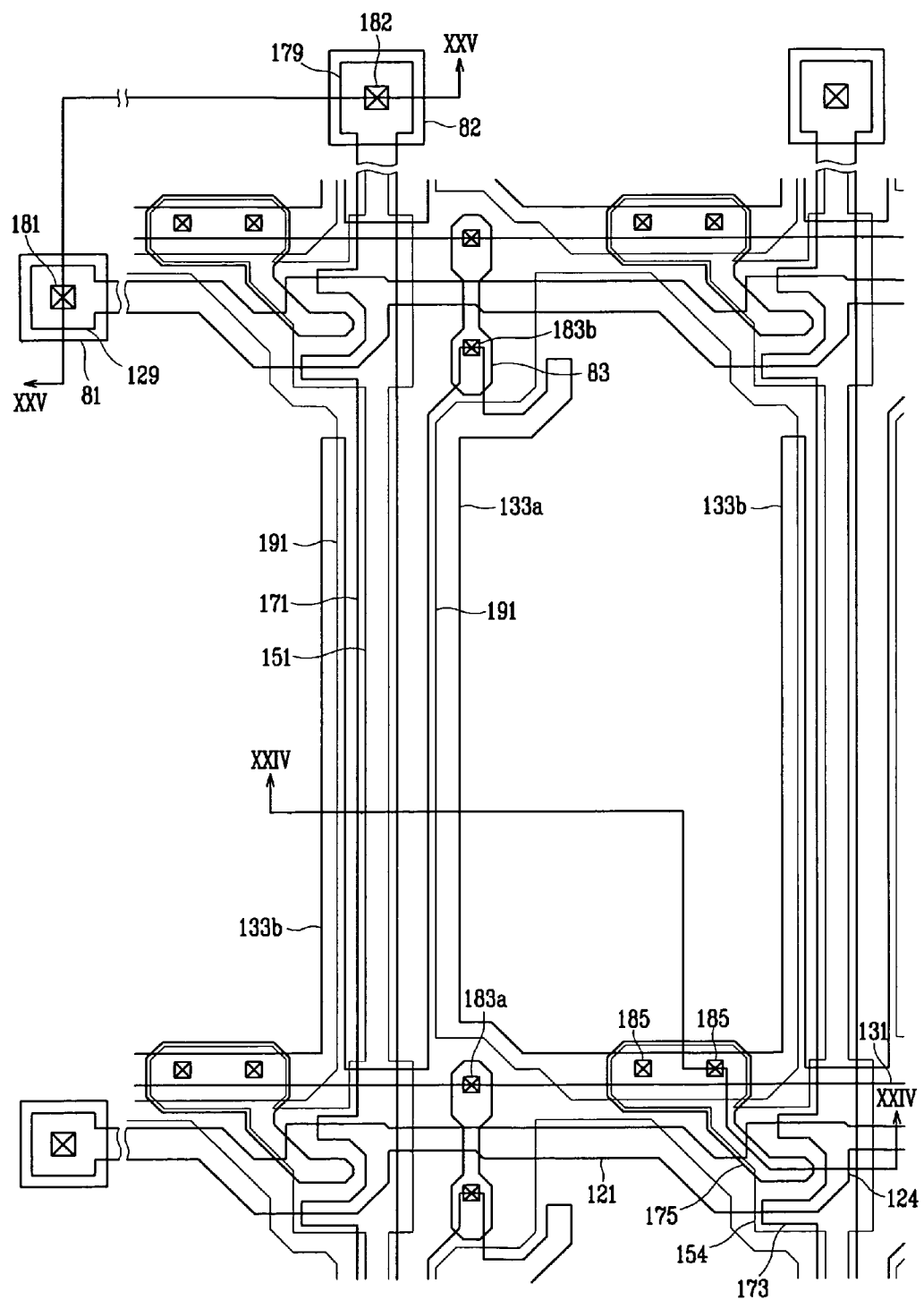
FIG. 23 is a layout view of an exemplary LCD according to a still another exemplary embodiment of the present invention.
Figure 24:
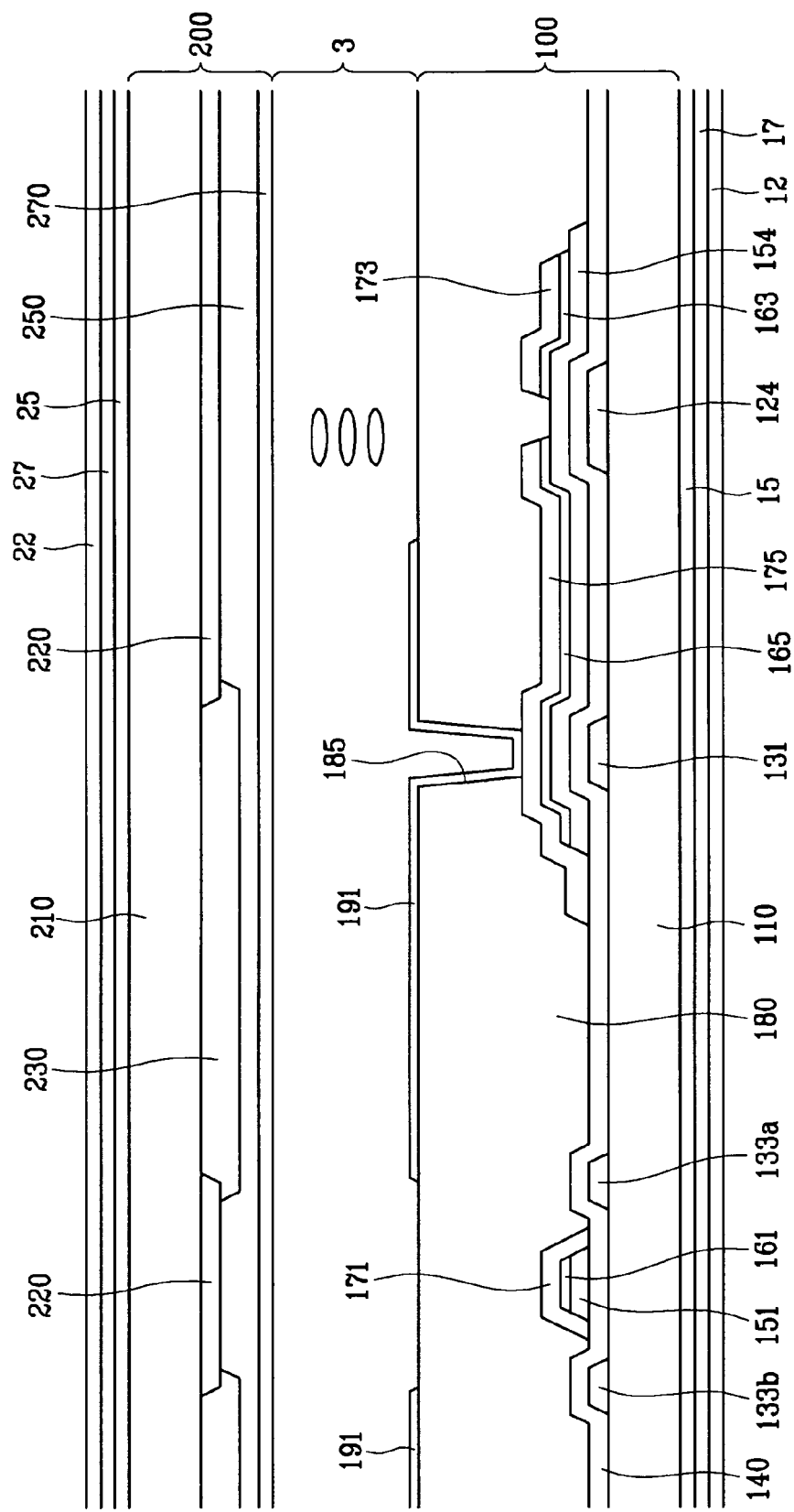
FIGS. 24 and 25 are cross-sectional views taken along lines XXIV-XXIV and XXV-XXV of the exemplary LCD in FIG. 23, respectively.
Figure 25:
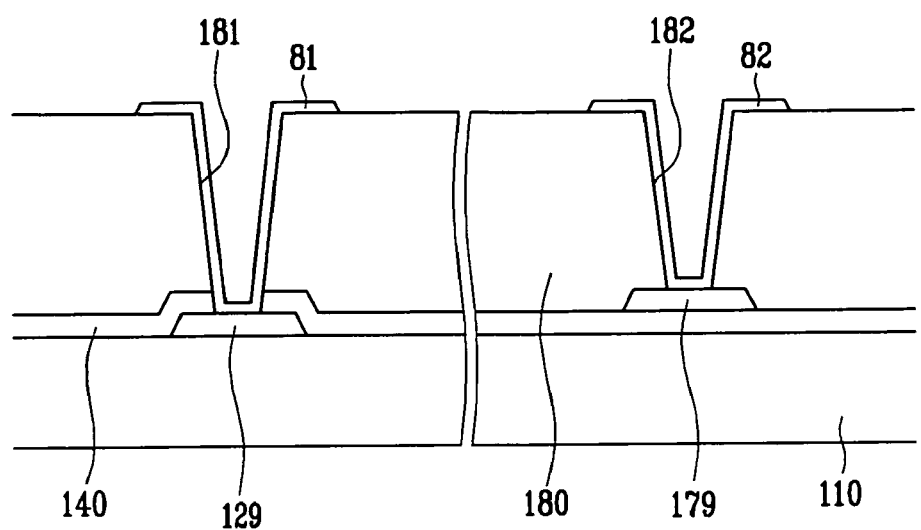

FIGS. 23 to 25 show an exemplary ECB mode LCD having the exemplary polarizer, the exemplary λ/4 plate, and an exemplary λ/2 plate attached together.

FIG. 23 is a layout view of an exemplary LCD according to another exemplary embodiment of the present invention, and FIGS. 24 and 25 are cross-sectional views taken along lines XXIV-XXIV and XXV-XXV of the exemplary LCD in FIG. 23, respectively.

The LCD shown in FIGS. 23 to 25 includes a TFT array panel 100, and a color filter display panel 200 having substantially the same structure as those shown in FIGS. 14 to 16, except for different films attached on the outer side of the LCD.

Such as shown in FIG. 24, on the upper side of the color filter display panel 200, an upper λ/4 plate 25, an upper λ/2 plate 27, and an upper polarizer 22 are sequentially attached, and on the lower side of the TFT array panel 100, a lower λ/4 plate 15, a lower λ/2 plate 17, and a lower polarizer 12 are sequentially attached.

The upper polarizer 22 and the lower polarizer 12 have an absorption axis, respectively, and absorb polarization light corresponding to the absorption axes and cause polarization light that is perpendicular thereto to transmit therethrough. The upper and lower λ/4 plates 25 and 15, which are like phase difference films, have a slow axis and allow polarization light in a slow axis direction to be slower by λ/4 compared with polarization light perpendicular thereto. The upper λ/2 plate 27 and the lower λ/2 plate 17, which are like phase difference films like the λ/4 plates 15 and 25, allow polarization light in a slow axis direction to be slower by λ/2 compared with polarization light perpendicular thereto.

Figure 26:
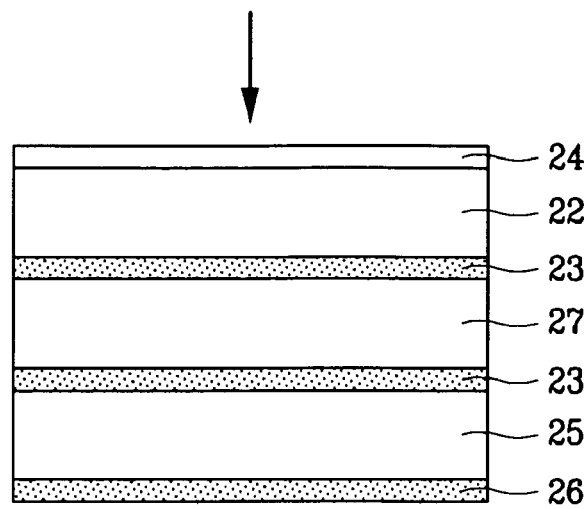
FIG. 26 is a drawing illustrating a section of exemplary films formed on an upper side of an exemplary color filter display panel.
Figure 27:
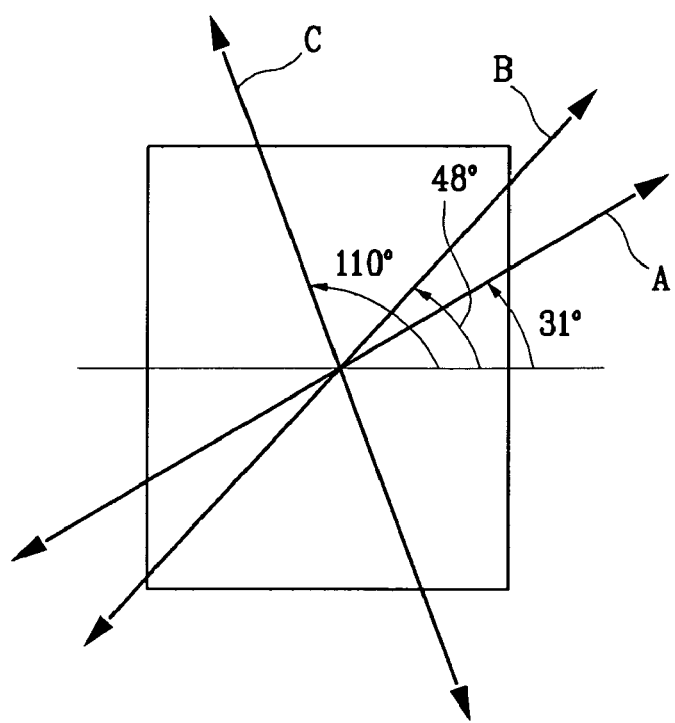
FIG. 27 is a drawing illustrating an angle relationship of the exemplary upper films of the exemplary color filter display panel.
Figure 28:
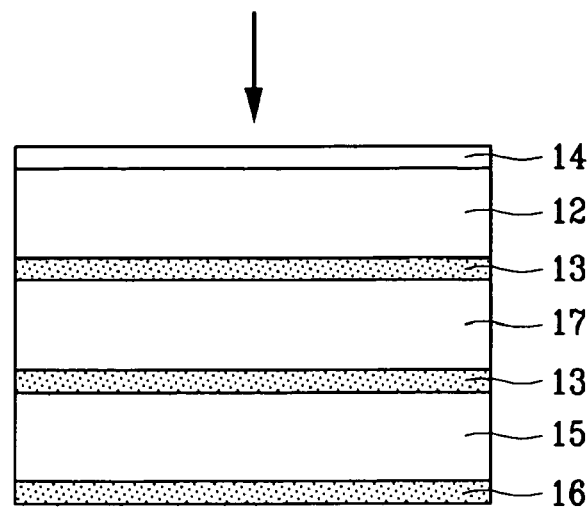
FIG. 28 is a drawing illustrating a section of exemplary films formed on a lower side of an exemplary TFT array panel.
Figure 29:
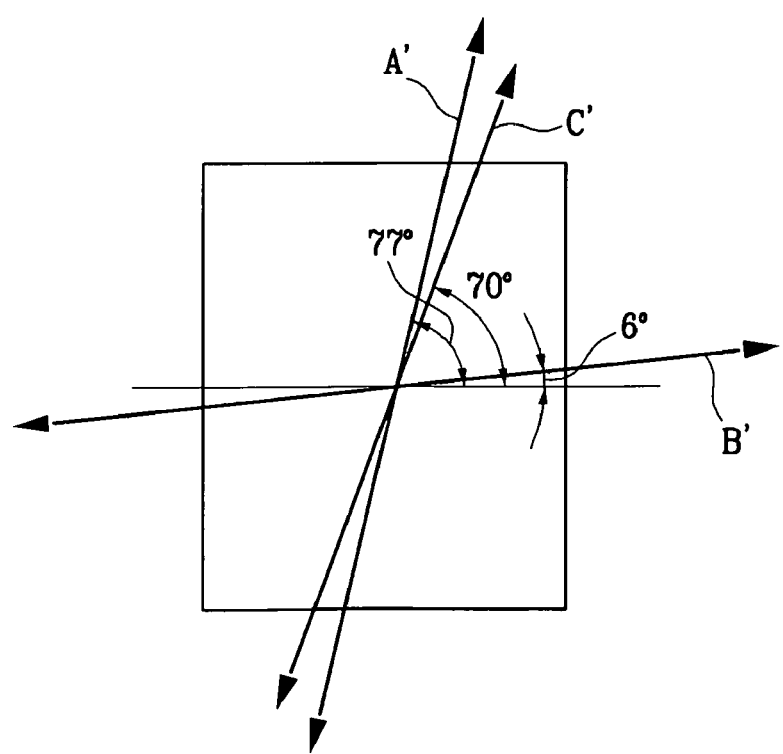
FIG. 29 is a drawing illustrating an angle relationship of the exemplary lower films of the exemplary TFT array panel.

The films attached on the outer side of the display panels 100 and 200 will be further described with reference to FIGS. 26 to 29. FIGS. 26 and 27 are drawings illustrating the exemplary films formed on the upper side of the exemplary color filter display panel 200, and FIGS. 28 and 29 are drawings illustrating the exemplary films formed on the lower side of the TFT array panel 100.

To begin with, the exemplary films attached on the upper side of the exemplary color filter display panel 200 will be described. FIG. 26 is a drawing illustrating a section of the exemplary films formed on the upper side of the exemplary color filter display panel.

On the upper side of the color filter display panel 200, the upper λ/4 plate 25, the upper λ/2 plate 27, and the upper polarizer 22 are formed, and an adhesive 23 is used to attach the upper λ/4 plate 25, the upper λ/2 plate 27, and the upper polarizer 22 to each other. An adhesive 26 may be used to attach the upper insulation substrate 210 to the upper λ/4 plate 25. A passivation layer 24 is formed at an outer side of the upper polarizer 22 to protect the upper polarizer 22 and the color filter display panel 200.

As the upper λ/4 plate 25 and the upper λ/2 plate 27, a film such as a Zeonor, polycarbonate ("PC"), or NR film can be used. Generally, the upper polarizer 22 has such a structure in which a TAC film is attached at both sides of a PVA film, and the passivation layer 24 for protecting the upper polarizer 22 is formed through an anti-glaring, anti-reflection, anti-scratching, or hard coating treatment, etc.

FIG. 27 is a drawing illustrating an angle relationship of the exemplary upper films of the exemplary color filter display panel. FIG. 27 shows the angle when the structure is observed from the top view in a state in which the color filter display panel 200 is formed at the lower side and the films are attached on the color filter display panel 200. The angle shown in FIG. 27 was measured based on the three o'clock direction.

With reference to FIG. 27, the line 'A' indicates a direction of an absorption axis of the upper polarizer 22, the line 'B' indicates a direction of a slow axis of the upper λ/2 plate 27, and the line 'C' indicates a direction of a slow axis of the upper λ/4 plate 25. That is, the absorption axis of the upper polarizer 22 is at 31 degrees from the three o'clock direction in the counterclockwise direction, the slow axis of the upper λ/2 plate 27 is at 48 degrees from the three o'clock direction in the counterclockwise direction, and the slow axis of the upper λ/4 plate 25 is at 110 degrees from the three o'clock direction in the counterclockwise direction. Herein, a phase difference value (Δnd) of the upper λ/2 plate 27 is 270 mm when the wavelength of light is 550 nm, and that of the upper λ/4 plate 25 is 135 nm when the wavelength of light is 550 nm. As the upper λ/2 plate 27, preferably, the film such as Zeonor or polycarbonate ("PC") is used, and as the upper λ/4 plate 25, Zeonor is preferably used.

The exemplary films attached on the lower side of the exemplary TFT array panel 100 will be described as follows. FIG. 28 is a drawing illustrating a section of exemplary films formed on the lower side of the exemplary TFT array panel.

On the lower side of the TFT array panel 100, the lower λ/4 plate 15, the lower λ/2 plate 17, and the lower polarizer 12 are sequentially attached, and an adhesive 13 is used to attach the lower λ/4 plate 15, the lower λ/2 plate 17, and the lower polarizer 12. A passivation layer 14 is formed at an outer side of the lower polarizer 12 to protect the lower polarizer 12 and the TFT array panel 100. In FIG. 28, the lowermost adhesive 16 is used to attach the lower insulation substrate 110 of the TFT array panel and the film.

As the lower λ/4 plate 15 and the lower λ/2 plate 17, the film such as Zeonor, polycarbonate ("PC"), or the NR film, etc., can be used. In general, the lower polarizer 12 has such a structure such that a TAC film is attached at both sides of a PVA film, and the passivation layer 14 is formed through an anti-glaring, anti-reflection, anti-scratching, or hard coating treatment, etc.

FIG. 29 is a drawing illustrating an angle relationship of the exemplary lower films of the exemplary TFT array panel. FIG. 29 shows the angle when the structure is viewed from the top in a state in which the TFT array panel 100 is formed at the lower side and the films are formed on the TFT array panel 100. The angles shown in FIG. 29 were measured based on the three o'clock direction.

With reference to FIG. 29, the line 'A'' indicates a direction of an absorption axis of the lower polarizer 12, the line 'B'' indicates a direction of a slow axis of the lower λ/2 plate 17, and the line 'C'' indicates a direction of a slow axis of the lower λ/4 plate 15. That is, the absorption axis of the lower polarizer 12 is at 77 degrees obtained by rotating from the three o'clock direction in the counterclockwise direction, the slow axis of the lower λ/2 plate 17 is at 6 degrees obtained by rotating from the three o'clock direction in the counterclockwise direction, and the slow axis of the lower λ/4 plate 15 is at 70 degrees obtained by rotating from the three o'clock direction in the counterclockwise direction. Herein, a phase difference value (Δnd) of the lower λ/2 plate 17 is 270 nm when the wavelength of light is 550 nm, and that of the lower λ/4 plate 15 is 100 nm when the wavelength of light is 550 nm. As the lower λ/2 plate 17, preferably, the film such as Zeonor or polycarbonate ("PC") is used, and as the lower λ/4 plate 15, the NR film is preferably used.

Table 3 shows the phase differences, the angle relationships, and the used materials in FIGS. 26 to 29 according to exemplary embodiments of the present invention.

TABLE 3

|  | Film | Δnd | Angle | Material |
| --- | --- | --- | --- | --- |
| Color filter display panel | Polarizer | *** | 31 |  |
|  | Film 1 (λ/2) | 270 nm | 48 | Zeonor or PC |
|  | Film 1 (λ/4) | 135 nm | 110 | Zeonor |
| TFT array panel | Polarizer | *** | 77 |  |
|  | Film 1 (λ/2) | 270 nm | 6 | Zeonor or PC |
|  | Film 1 (λ/4) | 135 nm | 70 | Zeonor |

Figure 30:
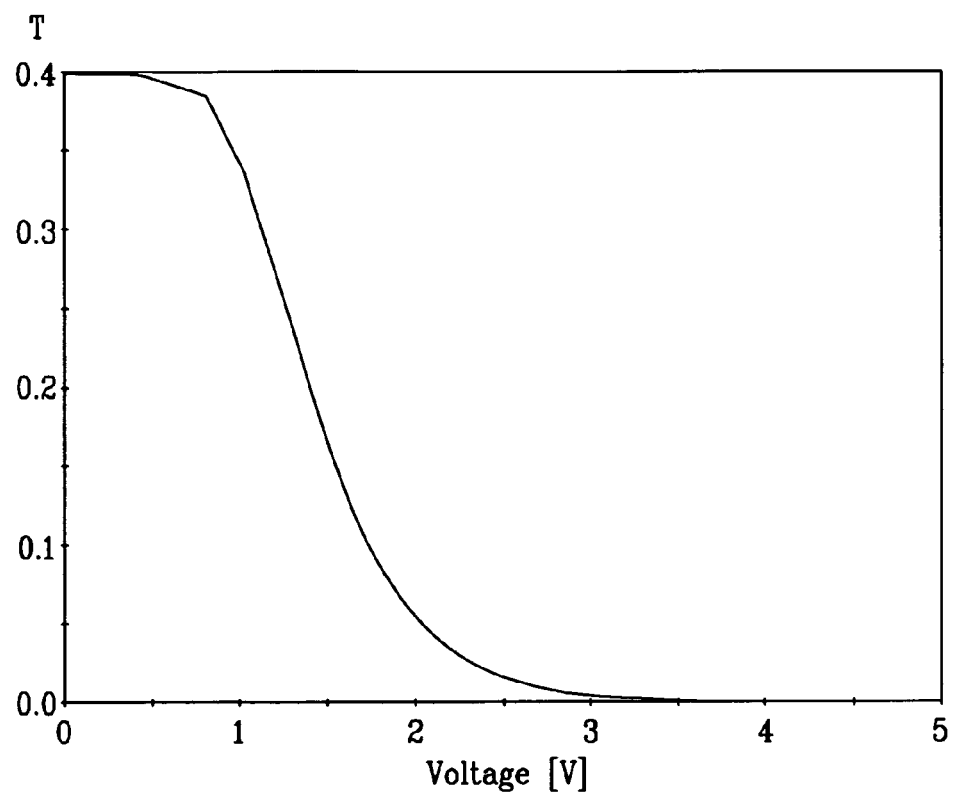
FIG. 30 is a graph showing a curve representing transmittance according to an applied voltage in the exemplary LCD according to exemplary embodiments of the present invention; and, FIG. 31 is a drawing illustrating viewing angles of the exemplary LCD according to exemplary embodiments of the present invention.
Figure 31:
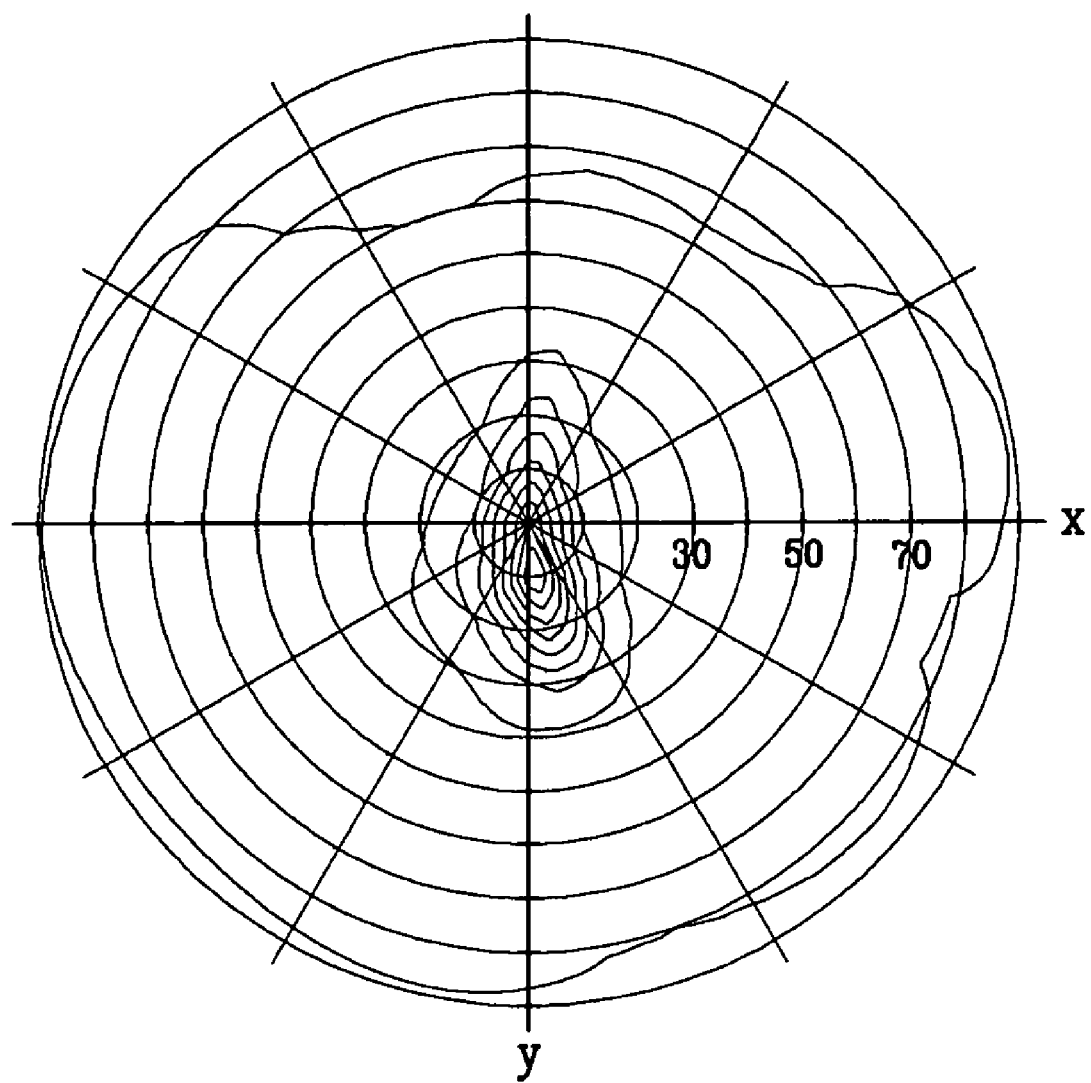

FIGS. 30 and 31 and Table 4 show results obtained by measuring transmittance (T), contrast ratio (CR), color coordinates, and phase difference values (Δnd) by controlling the cell gap according to the exemplary embodiments of the present invention.

TABLE 4

|  |  |  | White color | | |
| --- | --- | --- | --- | --- | --- |
| Cell gap | T | CR | x | y | Δnd |
| 3.4 | 0.35245 | 2538.09124 | 0.28680 | 0.30960 | 228.5 |
| 3.5 | 0.36541 | 4033.53640 | 0.28926 | 0.31301 | 235.2 |
| 3.6 | 0.37752 | 5551.74850 | 0.29185 | 0.31653 | 241.9 |
| 3.7 | 0.38870 | 5468.21429 | 0.29455 | 0.32017 | 248.6 |
| 3.8 | 0.39890 | 3995.27638 | 0.29740 | 0.32393 | 255.3 |
| 3.9 | 0.40805 | 2645.04121 | 0.30039 | 0.32782 | 262.1 |
| 4.0 | 0.41610 | 1775.51942 | 0.30353 | 0.33185 | 268.8 |

FIG. 30 is a graph showing a curve representing transmittance according to an applied voltage in the exemplary LCD according to exemplary embodiments of the present invention, and FIG. 31 is a drawing illustrating viewing angles of the exemplary LCD according to exemplary embodiments of the present invention.

The curve representing transmittance and the viewing angles as shown in FIGS. 30 and 31 are obtained when the cell gap is 3.8 in Table 4, which are sufficient transmittance and wide viewing angles. It can be noted that, compared with the exemplary embodiment in which only the λ/4 plate is used, the case as shown in FIGS. 30 and 31 shows similar transmittance but the exemplary embodiment in which the λ/4 plate and the λ/2 are used together shows wider viewing angles.

When a potential error in the exemplary embodiment as shown in FIGS. 26 to 29 is considered, the polarizers 12 and 22, the λ/2 plates 17 and 27, and the λ/4 plates 15 and 25 can have the following ranges.

The absorption axis of the upper polarizer 22 may be at 31±10 degrees from the three o'clock direction in the counterclockwise direction, the slow axis of the upper λ/2 plate 27 may be at 48±10 degrees from the three o'clock direction in the counterclockwise direction, and the slow axis of the upper λ/4 plate 25 may be at 110±10 degrees from the three o'clock direction in the counterclockwise direction. The phase difference value (Δnd) of the upper λ/2 plate 27 may be 270±20 nm when the wavelength of light is 550 nm, and the phase difference value (Δnd) of the upper λ/4 plate 25 may be 135±20 nm when the wavelength of light is 550 nm. The absorption axis of the lower polarizer 12 may be at 77±10 degrees from the three o'clock direction in the counterclockwise direction, the slow axis of the lower λ/2 plate 17 may be at 6±10 degrees from the three o'clock direction in the counterclockwise direction, and the slow axis of the lower λ/4 plate 15 may be at 70±10 degrees from the three o'clock direction in the counterclockwise direction. The phase difference value (Δnd) of the lower λ/2 plate 17 may be 270±20 nm when the wavelength of light is 550 nm, and the phase difference value (Δnd) of the lower λ/4 plate 15 may be 100±20 nm when the wavelength of light is 550 nm.

In the above exemplary embodiment of the present invention, the polarizers, the λ/2 plate, and the λ/4 plate are attached on opposite sides of the ECB mode LCD.

It should be understood that in the above-described exemplary embodiments, the angles are described with reference to a reference direction, and that the angles may be correspondingly changed with a change to the reference direction.

As stated above, by having the angles and phase differences as shown in Table 1 in the ECB mode LCD using the λ/4 plate and the polarizer or by having the angles and phase differences as shown in Table 3 in the ECB mode LCD using the λ/2 plate, the λ/4 plate, and the polarizer, the LCD can be fabricated with more improved transmittance and viewing angles.

As described above, by forming only the λ/4 plate between the polarizer and the display panel and setting the direction of the absorption axis of the polarizer and the slow axis of the λ/4 plate in the transflective LCD, the LCD can have the smaller thickness and its fabrication cost can be reduced while having better or at least the same characteristics as that of the related art transflective LCD using both λ/2 and λ/4 plates.

In addition, in fabricating the ECB mode LCD, its transmittance, contrast ratio, and viewing angles can be enhanced by attaching the λ/4 and λ/2 plate and allowing the absorption axis of the polarizer and the slow axis of the λ/4 and λ/2 plates to have predetermined angles.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A color filter display panel comprising:
    a substrate comprising color filters;
    a λ/4 plate formed on an outer side of the substrate and having a slow axis; and
    a polarizer attached on an outer side of the λ/4 plate and having an absorption axis,
    wherein the slow axis of the λ/4 plate is at 147±10 degrees with respect to a reference direction and the absorption axis of the polarizer is at 15±10 degrees with respect to the reference direction,
    wherein the color filter display panel comprises a transmitting region and a reflecting region, and
    wherein the λ/4 plate is disposed in the transmitting region and the reflecting region.

2. The display panel of claim 1, wherein the λ/4 plate has a phase difference value of 155±20 nm when a wavelength of light passing through the λ/4 plate is 550 nm.

3. The display panel of claim 1, wherein the substrate, the λ/4 plate, and the polarizer are attached to each other by an adhesive.

4. The display panel of claim 1, wherein the λ/4 plate is coated on a lower surface of the polarizer.

5. The display panel of claim 4, wherein the λ/4 plate is hardened with an alignment layer and a liquid crystal layer on the lower surface of the polarizer.

6. The display panel of claim 1, further comprising a passivation layer formed on an outer side of the polarizer through hard coating or an anti-reflective treatment.

7. The display panel of claim 1, wherein a λ/2 plate is excluded from the display panel to reduce a thickness of the display panel.

8. A liquid crystal display comprising a color filter display panel, a thin film transistor array panel, a liquid crystal formed therebetween, a transmitting region and a reflecting region,
wherein the color filter display panel comprises:
a first substrate comprising color filters;
a first λ/4 plate formed on an upper side of the first substrate and having a slow axis; and
a first polarizer attached on an upper side of the first λ/4 plate and having an absorption axis,
wherein the slow axis of the first λ/4 plate is at 147±10 degrees with respect to a reference direction, and the absorption axis of the first polarizer is at 15±10 degrees with respect to the reference direction, and
wherein the thin film transistor array panel comprises:
a second substrate comprising thin film transistors;
a second λ/4 plate formed on a lower side of the second substrate and having a slow axis; and
a second polarizer attached on a lower side of the second λ/4 plate and having an absorption axis,
wherein the slow axis of the second λ/4 plate is at 66±10 degrees with respect to the reference direction and the absorption axis of the second polarizer is at 105±10 degrees with respect to the reference direction,
wherein the first λ/4 plate and the second λ/4 plate are disposed in the transmitting region and the reflecting region.

9. The liquid crystal display of claim 8, wherein the first λ/4 plate has a phase difference value of 155±20 nm when a wavelength of light passing through the first λ/4 plate is 550 nm, and the second λ/4 plate has a phase difference value of 135±20 nm when a wavelength of light passing through the second λ/4 plate is 550 nm.

10. The liquid crystal display of claim 8, wherein the first substrate, the first λ/4 plate, and the first polarizer are attached to each other by an adhesive, and the second substrate, the second λ/4 plate, and the second polarizer are also attached to each other by an adhesive.

11. The liquid crystal display of claim 8, wherein the first and second λ/4 plates are coated on the first and second polarizers, respectively.

12. The liquid crystal display of claim 11, wherein the first and second λ/4 plates are hardened with an alignment layer and a liquid crystal layer on the first and second polarizers, respectively.

13. The liquid crystal display of claim 8, further comprising:
first and second passivation layers formed on outer sides of the first and second polarizers through hard coating or an anti-reflective treatment.

14. The liquid crystal display of claim 8, wherein a viewing angle of the liquid crystal formed between the color filter display panel and the thin film transistor array panel is ±40 degrees from a one o'clock direction.

15. The liquid crystal display of claim 8, wherein a λ/2 plate is excluded from the color filter display panel and from the thin film transistor array panel to reduce a thickness of the liquid crystal display, and angles of the slow axes and the absorption axes maintain luminance and viewing angle characteristics of the liquid crystal display.

* * * * *